(12) United States Patent
DeMeio et al.

(10) Patent No.: US 9,030,740 B2
(45) Date of Patent: May 12, 2015

(54) PHOTOCHROMIC ARTICLE HAVING AT LEAST PARTIALLY CROSSED POLARIZED PHOTOCHROMIC-DICHROIC AND FIXED-POLARIZED LAYERS

(75) Inventors: Rachel L. DeMeio, Gibsonia, PA (US); Anil Kumar, Murrysville, PA (US); John S. Ligas, Palm Harbor, FL (US); Truman Wilt, Clinton, PA (US); Delwin S. Jackson, Clearwater, FL (US); Henry Nguyen, Largo, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 285 days.

(21) Appl. No.: 13/616,591

(22) Filed: Sep. 14, 2012

(65) Prior Publication Data
US 2014/0078583 A1    Mar. 20, 2014

(51) Int. Cl.
| | | |
|---|---|---|
| *G02B 5/30* | (2006.01) |
| *G02B 5/23* | (2006.01) |
| *G02C 7/10* | (2006.01) |
| *C09K 19/38* | (2006.01) |
| *C09K 19/60* | (2006.01) |
| *G02C 7/12* | (2006.01) |
| *G03C 1/73* | (2006.01) |
| *C09K 19/04* | (2006.01) |

(52) U.S. Cl.
CPC .......... *G02B 5/3041* (2013.01); *G02B 5/3016* (2013.01); *G02B 5/23* (2013.01); *G02B 5/3033* (2013.01); *G02C 7/102* (2013.01); *C09K 19/38* (2013.01); *C09K 19/60* (2013.01); *G02C 7/12* (2013.01); *G03C 1/73* (2013.01); *C09K 2019/0448* (2013.01)

(58) Field of Classification Search
USPC .................. 359/241, 487.01, 487.02, 487.06; 351/44, 49; 349/96, 97
See application file for complete search history.

(56) References Cited

U.S. PATENT DOCUMENTS

| | | | |
|---|---|---|---|
| 6,245,399 B1 | 6/2001 | Sahouani et al. |
| 6,316,570 B1 | 11/2001 | Bonde et al. |
| 6,926,405 B2 | 8/2005 | Ambler et al. |
| 7,256,921 B2 | 8/2007 | Kumar et al. |
| 7,315,341 B2 | 1/2008 | Nimura et al. |
| 7,504,054 B2 | 3/2009 | Pyles et al. |
| 7,625,626 B2 | 12/2009 | Bear et al. |
| 8,003,005 B2 * | 8/2011 | He et al. ................... 252/299.01 |
| 8,077,373 B2 * | 12/2011 | Kumar et al. ................. 359/241 |
| 8,089,678 B2 * | 1/2012 | Kumar et al. ................. 359/241 |
| 8,177,358 B2 * | 5/2012 | Matera et al. ................... 351/49 |

(Continued)

FOREIGN PATENT DOCUMENTS

WO          0022463 A1    4/2000

*Primary Examiner* — Frank Font
(74) *Attorney, Agent, or Firm* — The Webb Law Firm

(57) ABSTRACT

Photochromic-dichroic articles are provided, which include a substrate having a first surface, a fixed-polarized layer over the first surface of the substrate, and a photochromic-dichroic layer over the first surface of the substrate. The fixed-polarized layer optionally includes a fixed-colorant and has a first polarization axis. The photochromic-dichroic layer includes a photochromic-dichroic compound that is laterally aligned within the photochromic-dichroic layer, and which defines a second polarization axis. The first polarization axis and the second polarization axis are oriented relative to each other at an angle of greater than 0° and less than or equal to 90°. The photochromic-dichroic articles can provide, for example, increased optical density and/or increased kinetics when exposed to a given amount of actinic radiation.

29 Claims, 6 Drawing Sheets

(56) References Cited

U.S. PATENT DOCUMENTS

| | | |
|---|---|---|
| 2002/0001700 A1 | 1/2002 | Sanefuji et al. |
| 2007/0291345 A1* | 12/2007 | Kumar et al. ............... 359/241 |
| 2008/0112049 A1* | 5/2008 | Umemoto et al. ........... 359/491 |
| 2008/0143926 A1 | 6/2008 | Amimori et al. |
| 2008/0187749 A1* | 8/2008 | Cael et al. .................... 428/354 |
| 2009/0135462 A1 | 5/2009 | Kumar et al. |
| 2009/0146104 A1 | 6/2009 | He et al. |
| 2010/0014010 A1* | 1/2010 | He et al. ...................... 349/13 |
| 2010/0075070 A1 | 3/2010 | Nagai et al. |
| 2011/0128457 A1* | 6/2011 | He et al. ...................... 349/20 |
| 2011/0129678 A1 | 6/2011 | He et al. |
| 2011/0234969 A1 | 9/2011 | Amimori et al. |
| 2012/0120473 A1 | 5/2012 | Kumar et al. |

* cited by examiner

PHOTOCHROMIC ARTICLE HAVING AT LEAST PARTIALLY CROSSED POLARIZED PHOTOCHROMIC-DICHROIC AND FIXED-POLARIZED LAYERS

FIELD

The present invention relates to a photochromic-dichroic article that includes a substrate, a fixed-polarized layer positioned over a first surface of the substrate, and a photochromic-dichroic layer positioned over the fixed-polarized layer, in which the polarization axes of the recited layers are oriented relative to each other at an angle of greater than 0° and less than or equal to 90°.

BACKGROUND

Conventional linearly polarizing elements, such as linearly polarizing lenses for sunglasses and linearly polarizing filters, are typically formed from unilaterally stretched polymer sheets, which can optionally contain a dichroic material, such as a dichroic dye. Consequently, conventional linearly polarizing elements are static elements having a single, linearly polarizing state. Accordingly, when a conventional linearly polarizing element is exposed to either randomly polarized radiation or reflected radiation of the appropriate wavelength, some percentage of the radiation transmitted through the element is linearly polarized.

In addition, conventional linearly polarizing elements are typically tinted. Typically, conventional linearly polarizing elements contain a static or fixed coloring agent and have an absorption spectrum that does not vary in response to actinic radiation. The color of the conventional linearly polarizing element will depend upon the static coloring agent used to form the element, and most commonly, is a neutral color (for example, brown, blue, or gray). Thus, while conventional linearly polarizing elements are useful in reducing reflected light glare, because of their static tint, they are typically not well suited for use under conditions of reduced or low ambient light. Further, because conventional linearly polarizing elements have only a single, tinted linearly polarizing state, they are limited in their ability to store or display information.

Conventional photochromic elements, such as photochromic lenses that are formed using conventional thermally reversible photochromic materials are generally capable of converting from a first state, for example a "clear state," to a second state, for example a "colored state," in response to actinic radiation, and reverting back to the first state in response to thermal energy. Thus, conventional photochromic elements are generally well suited for use in both low-light and bright conditions. Conventional photochromic elements, however, that do not include linearly polarizing filters are generally not capable of linearly polarizing radiation. The absorption ratio of conventional photochromic elements, in either state, is generally less than two. Therefore, conventional photochromic elements are not capable of reducing reflected light glare to the same extent as conventional linearly polarizing elements. In addition, conventional photochromic elements have a limited ability to store or display information.

Photochromic-dichroic compounds and materials have been developed that provide both photochromic properties and dichroic properties, if properly and at least sufficiently aligned. When in a colored or darkened state, such as when exposed to actinic radiation, photochromic-dichroic compounds, however, typically have a larger percent transmittance than non-polarizing or conventional photochromic compounds at equivalent concentrations and sample thickness. While not intending to be bound by any theory, and based on the evidence at hand, it is believed that the increased percent transmittance of photochromic-dichroic materials in the darkened or colored state is due to the percent transmittance being an average of the two orthogonal plane polarized components of the polarized radiation. A photochromic-dichroic material will more strongly absorb one of the two orthogonal plane polarized components of the incident random radiation, resulting in one of the planes of transmitted polarized light (passing through and out of the sample) having a greater percent transmittance than the other orthogonal plane polarized component. The average of the two orthogonal plane polarized components typically results in an average percent transmittance of greater magnitude. In general, as the linearly polarizing efficiency, which can be quantified in terms of absorption ratio, of photochromic-dichroic compounds increases, the percent transmittance associated therewith also increases.

It would be desirable to develop new polarizing photochromic articles that include photochromic-dichroic compounds, and which provide a combination of linear polarizing properties, and reduced percent transmittance when in a colored or darkened state, such as when exposed to actinic light. It would be further desirable that such newly developed polarizing photochromic articles have increased optical density and/or increased kinetics, such as increased fade rates, when exposed to a given amount of actinic radiation.

SUMMARY

In accordance with the present invention, there is provided a photochromic-dichroic article that comprises, (a) a substrate having a first surface and a second surface. The photochromic-dichroic article also comprises (b) a fixed-polarized layer positioned over the first surface of the substrate. The fixed-polarized layer has a first polarization axis. The photochromic-dichroic article further comprises (c) a photochromic-dichroic layer positioned over the first surface of said substrate. The photochromic-dichroic layer comprises a photochromic-dichroic compound, which is laterally aligned within the photochromic-dichroic layer, and which defines a second polarization axis of the photochromic-dichroic layer. The first polarization axis and the second polarization axis are oriented relative to each other at an angle of greater than 0° and less than or equal to 90°.

In accordance with the present invention, there is further provided a photochromic-dichroic article, as described above, that further comprises a birefringent layer comprising a polymer, in which the birefringent layer is interposed between the fixed-polarized layer and the photochromic-dichroic layer.

In accordance with the present invention, there is additionally provided a photochromic-dichroic article that comprises, (a) a substrate having a first surface and a second surface, in which the substrate has a first polarization axis. The photochromic-dichroic article further comprises (b) a photochromic-dichroic layer positioned over the first surface of the substrate. The photochromic-dichroic layer comprises a photochromic-dichroic compound, which is laterally aligned within the photochromic-dichroic layer, and which defines a second polarization axis of the photochromic-dichroic layer. The first polarization axis and the second polarization axis are oriented relative to each other at an angle of greater than 0° and less than or equal to 90°.

In accordance with the present invention, there is additionally further provided a photochromic-dichroic article, as described above, that further comprises a birefringent layer comprising a polymer, in which the birefringent layer is interposed between the linearly polarizing substrate and the photochromic-dichroic layer.

BRIEF DESCRIPTION OF THE DRAWINGS

In FIGS. 1 through 6 like characters refer to the same structural features and components unless otherwise stated.

DETAILED DESCRIPTION

Figure 1:
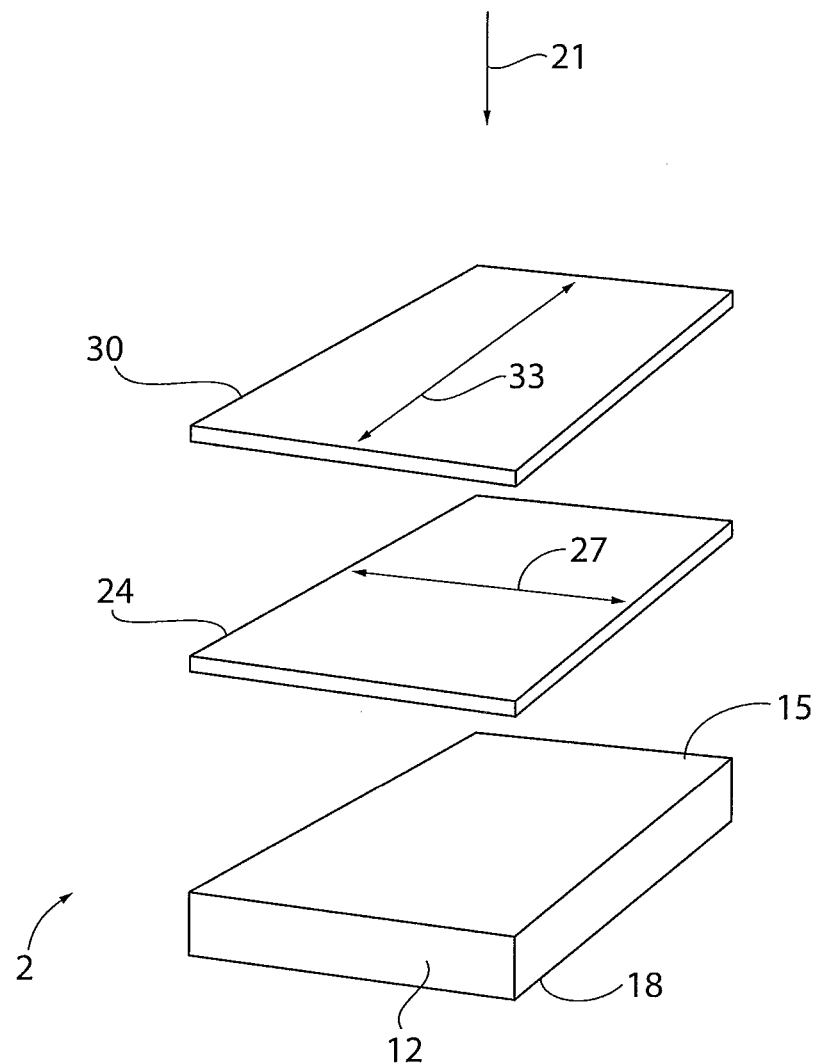
FIG. 1 is a representative exploded perspective view of a photochromic-dichroic article according to some embodiments of the present invention that includes separate fixed-polarized and photochromic-dichroic layers.

As used herein, the term "actinic radiation" and similar terms, such as "actinic light" means electromagnetic radiation that is capable of causing a response in a material, such as, but not limited to, transforming a photochromic material from one form or state to another as will be discussed in further detail herein.

As used herein, the term "photochromic" and related terms, such as "photochromic compound" means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein the term "dichroic" means capable of absorbing one of two orthogonal plane polarized components of at least transmitted radiation more strongly than the other.

As used herein, the term "photochromic-dichroic" and similar terms, such as "photochromic-dichroic materials" and "photochromic-dichroic compounds" means materials and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein the term "absorption ratio" refers to the ratio of the absorbance of radiation linearly polarized in a first plane to the absorbance of the same wavelength radiation linearly polarized in a plane orthogonal to the first plane, in which the first plane is taken as the plane with the highest absorbance.

As used herein to modify the term "state," the terms "first" and "second" are not intended to refer to any particular order or chronology, but instead refer to two different conditions or properties. For purposes of non-limiting illustration, the first state and the second state of the photochromic-dichroic compound of a photochromic-dichroic layer can differ with respect to at least one optical property, such as but not limited to the absorption or linear polarization of visible and/or UV radiation. Thus, according to various non-limiting embodiments disclosed herein, the photochromic-dichroic compound of a photochromic-dichroic layer can have a different absorption spectrum in each of the first and second state. For example, while not limiting herein, the photochromic-dichroic compound of a photochromic-dichroic layer can be clear in the first state and colored in the second state. Alternatively, the photochromic-dichroic compound of a photochromic-dichroic layer can have a first color in the first state and a second color in the second state. Further, as discussed below in more detail, the photochromic-dichroic compound of a photochromic-dichroic layer can be non-linearly polarizing (or "non-polarizing") in the first state, and linearly polarizing in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display articles, elements and devices include screens, monitors, and security elements, such as security marks.

As used herein the term "window" means an aperture adapted to permit the transmission of radiation therethrough. Non-limiting examples of windows include automotive and aircraft transparencies, filters, shutters, and optical switches.

As used herein the term "mirror" means a surface that specularly reflects a large or substantial fraction of incident light.

As used herein the term "liquid crystal cell" refers to a structure containing a liquid crystal material that is capable of being ordered. Active liquid crystal cells are cells in which the liquid crystal material is capable of being reversibly and controllably switched or converted between ordered and disordered states, or between two ordered states by the application of an external force, such as electric or magnetic fields. Passive liquid crystal cells are cells in which the liquid crystal material maintains an ordered state. A non-limiting example of an active liquid crystal cell element or device is a liquid crystal display.

As used herein the term "coating" means a supported film derived from a liquid or solid particulate flowable composition, which may or may not have a uniform thickness, and specifically excludes polymeric sheets. For purposes of non-limiting illustration, an example of solid particulate flowable composition is a powder coating composition. The fixed-polarized layer, second photochromic-dichroic layer, and optional further layers, such as an optional primer layer, and an optional topcoat layer, of the photochromic-dichroic articles of the present invention can, in some embodiments, each independently be a coating or formed from a coating composition.

As used herein the term "sheet" means a pre-formed film having a generally uniform thickness and capable of self-support.

As used herein the term "connected to" means in direct contact with an object or indirect contact with an object through one or more other structures or materials, at least one of which is in direct contact with the object. For purposes of non-limiting illustration, the fixed-polarized layer, with some embodiments for example, can be in direct contact (e.g., abutting contact) with at least a portion of the substrate or it can be in indirect contact with at least a portion of the substrate through one or more other interposed structures or materials, such as being in direct contact (e.g., abutting contact) with at least a portion of the substrate or it can be in indirect contact with at least a portion of the substrate through one or more other interposed structures or materials, such as a primer layer and/or a monomolecular layer of a coupling or adhesive agent. For example, although not limiting herein, the fixed-polarized layer, with some embodiments, can be in contact with one or more other interposed coatings, polymer sheets or combinations thereof, at least one of which is in direct contact with at least a portion of the substrate, such as the first surface of the substrate.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation with regard to the visually observed color thereof, including, but not limited to, fixed colorants, such as fixed (or static) tints and fixed (or static) dyes.

As used herein, the term "fixed-polarized" and related terms, such as "fixed-polarized layer," "fixed-polarized film," and "fixed-polarized sheet" means a structure, such as a layer, film, or sheet that at least: (i) is capable of absorbing one of two orthogonal plane polarized components of at least transmitted radiation more strongly than the other; (ii) has a polarization axis (such as a first polarization axis); (iii) does not physically or chemically respond to, and is not physically or chemically altered by exposure to, actinic radiation, with regard to absorbing one of two orthogonal plane polarized components of at least transmitted radiation more strongly than the other; and (iv) has a single, linearly polarizing state.

As used herein, the term "fixed colorant" and related terms, such as "fixed-colorant," "static colorant," "fixed dye," "static dye" means colorants that are non-photosensitive materials, which do not physically or chemically respond to electromagnetic radiation with regard to the visually observed color thereof.

As used herein, molecular weight values of polymers, such as weight average molecular weights (Mw), number average molecular weights (Mn), and z-average molecular weights (Mz) are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers, including but not limited to, comb graft polymers, star graft polymers, and dendritic graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein and in the claims, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

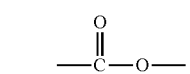

or equivalently —C(O)O—, is inclusive of the right-to-left representation thereof,

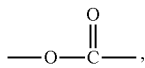

or equivalently —O(O)C— or —OC(O)—.

As used herein, the articles "a," "an," and "the" include plural referents unless otherwise expressly and unequivocally limited to one referent.

As used herein, the term "a fixed colorant" means at least one fixed colorant.

As used herein, the term "a photochromic-dichroic compound" means at least one photochromic-dichroic compound.

As used herein, and unless otherwise indicated, "percent transmittance" can be determined using an art-recognized instrument, such as an ULTRASCAN PRO spectrometer obtained commercially from HunterLab, in accordance with instructions provided in the spectrometer user manual.

As used herein the term "linearly polarize" means to confine the vibrations of the electric vector of electromagnetic waves, such as light waves, to one direction or plane.

Other than in the operating examples, or where otherwise indicated, all numbers expressing quantities of ingredients, reaction conditions, and so forth used in the specification and claims are to be under stood as modified in all instances by the term "about."

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," "residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

The photochromic-dichroic articles of the present invention include a substrate. Substrates from which the substrate of the photochromic-dichroic articles of the present invention can be selected include, but are not limited to, substrates formed from organic materials, inorganic materials, or combinations thereof (for example, composite materials). Non-limiting examples of substrates that can be used in accordance with various non-limiting embodiments disclosed herein are described in more detail below.

Non-limiting examples of organic materials that can be used to form the substrate of the photochromic-dichroic articles of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate can, with some embodiments, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Other non-limiting examples of organic materials suitable for use in forming the substrate of the photochromic-dichroic articles of the present invention include both synthetic and natural organic materials, including without limitation: opaque or translucent polymeric materials, natural and synthetic textiles, and cellulosic materials such as, paper and wood.

Non-limiting examples of inorganic materials suitable for use in forming the substrate of the photochromic-dichroic articles of the present invention include glasses, minerals, ceramics, and metals. For example, in one non-limiting embodiment the substrate can include glass. In other non-limiting embodiments, the substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Further, according to certain non-limiting embodiments disclosed herein, the substrate can have a protective coating, such as, but not limited to, an abrasion-resistant coating, such as a "hard coat," on its exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s).

Still further, the substrate of the photochromic-dichroic articles of the present invention can be selected from untinted (or non-tinted) substrates, tinted substrates, linearly polarizing substrates, tinted linearly polarizing substrates, circularly polarizing substrates, elliptically polarizing substrates, photochromic substrates, or tinted-photochromic substrates. With some embodiments, and as will be discussed in further detail herein, the substrate has a first polarization axis and optionally includes a fixed-colorant, and as such is a linearly polarizing substrate that optionally includes a fixed-colorant.

As used herein with reference to substrates the term "untinted" means substrates that are essentially free of coloring agent additions (such as, but not limited to, fixed-colorants, such as conventional dyes) and have an absorption spectrum for visible radiation that does not vary significantly in response to actinic radiation. Further, with reference to substrates the term "tinted" means substrates that have a coloring agent addition (such as, but not limited to, fixed-colorants, such as conventional dyes) and an absorption spectrum for visible radiation that does not vary significantly in response to actinic radiation.

As used herein the term "linearly polarizing" with regard to the substrate means substrates that are adapted to linearly polarize radiation. As used herein the term "circularly polarizing" with regard to the substrate means substrates that are adapted to circularly polarize radiation. As used herein the term "elliptically polarizing" with regard to the substrate means substrates that are adapted to elliptically polarize radiation. As used herein with the term "photochromic" with regard to the substrate means substrates having an absorption spectrum for visible radiation that varies in response to at least actinic radiation. Further, as used herein with regard to the substrate, the term "fixed-tint-photochromic" means substrates containing a fixed-coloring agent as well as a photochromic material, and having an absorption spectrum for visible radiation that varies in response to at least actinic radiation. Thus, for example and without limitation, a fixed-tint-photochromic substrate can have a first color characteristic of the fixed-coloring agent (or fixed-colorant) and a second color characteristic of the combination of the fixed coloring agent the photochromic material when exposed to actinic radiation.

With reference to FIG. 1, and for purposes of non-limiting illustration, a photochromic-dichroic article 2 according to some embodiments of the present invention is depicted. Photochromic-dichroic article 2 includes a substrate 12 that has a first surface 15 and a second surface 18. First surface 15 of substrate 12, with some embodiments, faces incident actinic radiation depicted by arrow 21. Photochromic-dichroic article 2 further includes a fixed-polarized layer 24 that is positioned over first surface 15 of substrate 12. Fixed-polarized layer 24 is a linearly polarizing layer, and as such has a first polarization axis depicted by double headed arrow 27.

Photochromic-dichroic article 2 further includes a photochromic-dichroic layer 30 that is positioned over first surface 15 of substrate 12. With some embodiments, the photochromic-dichroic layer 30 is interposed between first surface 15 of substrate 12 and the fixed-polarized layer 24 (not depicted in FIG. 1). With some further embodiments, the fixed-polarized layer is interposed between the first surface of the substrate and the photochromic-dichroic layer. For purposes of non-limiting illustration and as depicted in FIG. 1, fixed-polarized layer 24 is interposed between first surface 15 of substrate 12 and photochromic-dichroic layer 30.

With some embodiments fixed-polarized layer 24 abuts first surface 15 of substrate 12. In accordance with additional embodiments, one or more additional layers, such as a primer layer (not shown), are interposed between first surface 15 of substrate 12 and fixed-polarized layer 24. With some further embodiments, photochromic-dichroic layer 30 abuts first surface 15 of substrate 12. With some further additional embodiments, one or more additional layers, such as a primer layer (not shown) and/or a first alignment layer (not shown), are interposed between first surface 15 of substrate 12 and photochromic-dichroic layer 30.

The photochromic-dichroic layer includes at least one photochromic-dichroic compound. The photochromic-dichroic compound is laterally aligned within the photochromic-dichroic layer. By laterally aligned means that the photochromic-dichroic compound is aligned laterally across at least a portion of the width or length of the photochromic-dichroic layer. The photochromic-dichroic compound can be laterally aligned along the upper and/or lower surfaces of the photochromic-dichroic layer, within at least a portion of the interior of the photochromic-dichroic layer, or any combination thereof. Lateral alignment of the photochromic-dichroic compound within the photochromic-dichroic layer serves to define a second polarization axis of the photochromic-dichroic layer. With non-limiting reference to FIG. 1, photochromic-dichroic layer 30 has a second polarization axis as depicted by double-headed arrow 33.

With the photochromic-dichroic articles of the present invention, the first polarization axis of the fixed-polarized layer and the second polarization axis of the photochromic-dichroic layer are oriented relative to each other at an angle of greater than 0° and less than or equal to 90°, such as from 0.1° to 90°, or from 1° to 90°, or from 10° to 90°, or from 25° to 90°, or from 45° to 90°, or from 60° to 90°, inclusive of the recited values. With some embodiments, when the first and second polarization axes are oriented relative to each other at an angle of 90°, the photochromic-dichroic articles of the present invention have a minimum level of transmittance of incident actinic radiation, provided the photochromic-dichroic compound undergoes both photochromic activation (e.g., being converted to a colored state) and dichroic activation when exposed to incident actinic radiation, such as when exposed to direct sunlight.

Depending on the wavelength or range of wavelengths, and/or energy (or strength) of incident electromagnetic radiation, and relative positioning of the fixed-polarized layer and the photochromic-dichroic layer, the photochromic-dichroic articles of the present invention can provide a variety of photochromic and/or dichroic responses, resulting in a variety of observable colors, color intensities, polarization effects, and/or at least partially crossed polarization effects. The photochromic dichroic compound, of the photochromic-dichroic layer, can, with some embodiments, undergo any combination of photochromic activation (e.g., conversion to a colored state) and/or dichroic activation (resulting in at least partial linear polarization of incident electromagnetic radiation). With some further embodiments, the photochromic dichroic compound, of the photochromic-dichroic layer, can undergo substantially no photochromic activation and substantially no dichroic activation, such as when the photochromic-dichroic article is exposed to ambient indoor light, such as fluorescent light.

With some embodiments, the photochromic-dichroic layer is interposed between the first surface of the substrate and the fixed-polarized layer, in which case the overlying fixed-polarized layer can absorb certain wavelengths of and/or a certain amount of energy of the incident electromagnetic radiation, resulting in the photochromic dichroic compound, of the underlying photochromic-dichroic layer, undergoing: any combination of photochromic activation (e.g., conversion to a colored state) and/or dichroic activation (resulting in at least partial linear polarization of incident electromagnetic radiation); or substantially no photochromic activation and substantially no dichroic activation.

In accordance with some embodiments, the fixed-polarized layer can be adapted so as to have a first polarization axis. Such adaptations include, but are not limited to: (i) the presence of one or more dichroic materials or compounds that are aligned along a first lateral direction within the fixed-polarized layer; (ii) the fixed-polarized layer includes a polymer that is laterally aligned along a first lateral direction within the fixed-polarized layer; (iii) the presence of aligned nano-scale structures on at least one surface of the fixed-polarized layer that are aligned along a first lateral direction; (iv) the polarizing (or Brewster) angle of the material(s) from which the fixed-polarized layer is fabricated; (v) the fixed-polarized layer including, at least in part, a lyotropic liquid crystal matrix that acts a host to a dye, which are together aligned along an first lateral direction; and (vi) combinations of two or more such adaptations (i) through (v).

With some embodiments, the fixed-polarized layer includes a dichroic material or compound, such as one or more conventional dichroic compounds, that is aligned along a first lateral direction within the fixed-polarized layer, and thereby defines the first polarization axis of the fixed-polarized layer. The dichroic material can be aligned by art-recognized methods, such as, but not limited to, shear forces and/or alignment with a polymer matrix of the fixed-polarized layer.

With some embodiments of the present invention, the fixed-polarized layer comprises a polymer, the polymer is laterally aligned along a first lateral direction within the fixed-polarized layer and defines the first polarization axis of the fixed-polarized layer. The polymer of the fixed-polarized layer can be laterally aligned in accordance with art-recognized methods, such as, but not limited to, unilateral stretching of the fixed-polarized layer.

With some embodiments, the fixed-polarized layer further includes one or more fixed-colorants such as conventional dyes. In accordance with some embodiments, the fixed-polarized layer includes a polymer that is laterally aligned along a first lateral direction within the fixed-polarized layer so as to define the first polarization axis thereof, and the fixed-polarized layer further includes at least one of a dichroic compound and optionally a fixed-colorant. The dichroic compound can be laterally aligned with the polymer along the first lateral direction. The fixed-polarized layer, in accordance with some embodiments, is free of photochromic compounds.

The optional fixed-colorant of the fixed-polarized layer, with some embodiments of the present invention, comprises a fixed dye selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures thereof.

The fixed-colorant, with some embodiments, can be present in the fixed-polarized layer in amounts sufficient to provide a desired color and percent transmittance of actinic radiation, such as visible light. The types and amounts of fixed-colorant can be selected, with some embodiments, to provide the photochromic-dichroic article with a base color and base percent transmittance, when the photochromic-dichroic compound of the photochromic-dichroic layer undergoes neither photochromic activation nor dichroic activation. The types and amounts of fixed colorant can be selected, with some embodiments, to provide the photochromic-dichroic article with one or more activated colors and one or more activated percent transmittance values, when the photochromic-dichroic compound of the photochromic-dichroic layer undergoes photochromic activation and/or dichroic activation. The fixed-colorant can be present in the fixed-polarized layer in varying amounts to provide the intended effect such as done with other conventional additives.

Classes of dichroic compounds, such as conventional dichroic compounds, that can be included, with some embodiments, in the fixed-polarized layer of the photochromic-dichroic articles of the present invention can, include, but are not limited to, azomethines, indigoids, thioindigoids, merocyanines, indans, quinophthalonic dyes, perylenes, phthaloperines, triphenodioxazines, indoloquinoxalines, imidazotriazines, tetrazines, azo and (poly)azo dyes, benzoquinones, naphthoquinones, anthraquinone and (poly)anthraquinones, anthrapyrimidinones, iodine and iodides.

Dichroic compounds can be present in the fixed-polarized layer, with some embodiments, in an amount of at least 0.001 percent by weight and less than or equal to 99.0 percent by weight, such as from 0.1 to 50 percent by weight, or from 1.0 to 20 percent by weight, in which the percent weights are in each case based on total weight of the fixed-polarized layer.

The fixed-polarized layer can further optionally include at least one additive that can facilitate one or more of the processing, the properties, or the performance of the fixed-polarized layer. Non-limiting examples of such conventional additives include, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

In accordance with some embodiments, the fixed-polarized layer can be adapted to have a first polarization axis by the presence of a plurality of aligned nano-scale structures on at least one surface of the fixed-polarized layer. The plurality of aligned nano-scale structures define the first polarization axis of the fixed-polarized layer. With some embodiments, the nano-scale structures include a plurality of substantially parallel ribs (such as elevated ribs), in which each rib is laterally spaced from an adjacent rib. The lateral spacing between the ribs is, with some embodiments, nano-scale to provide a polarizing effect.

The ribs can be fabricated from non-organic materials including, but not limited to, one or more metals, metal alloys, inorganic materials, such as metal oxides, and combinations thereof. Examples of metals from which the ribs can be fabricated include, but are not limited to, Al, Ti, Zn, Cu, Cr, Ta, Nb, mixtures of two or more thereof, combinations of two or more thereof, and alloys of two or more thereof. Examples of metal oxides from which the ribs can be fabricated include, but are not limited to, oxides of Si, Al, Zr, Ti, Ge, Sn, In, Zn, Sb, Ta, Nb, V, Y, mixtures of two or more thereof, and combinations of two or more thereof.

The nano-scale structures can be prepared by art-recognized methods, such as depositing an inorganic material (such as a metal or metal oxide) on a surface of the fixed-polarizing layer, and etching the deposited inorganic materials so as to form the structures. The etching can be conducted in accordance with art-recognized methods, such as but not limited to, chemical etching, physical etching, and etching with actinic radiation (such as electron beam etching). The deposited material has a thickness, with some embodiments, that is at least sufficient to allow formation of the parallel grooves and ribs therein. With some embodiments, the deposited material has a thickness of greater than 0 micrometers (µm) and less than or equal to 10 µm, or less than or equal to 5 µm, or less than or equal to 1 µm.

To improve adhesion of the nano-scale structures to the surface of the fixed-polarized layer, and with some embodiments, a sub-layer (with some embodiments, composed of a metal, such as metallic chromium, or a metal oxide) is first deposited on the surface of the fixed-polarized layer. The sub-layer, with some embodiments, is thinner than the subsequently deposited layer (into which the grooves and ribs are formed). With some embodiments, the sub-layer has a thickness of greater than 0 nm and less than or equal to 300 nm, or less than or equal to 100 nm, or less than or equal to 20 nm. Examples of linear polarizers that include aligned nano-scale structures include, but are not limited to, PROFLUX® polarizers (including visible light polarizers) that are commercially available from MOXTEK Incorporated.

With some embodiments of the present invention, the first polarization axis of the fixed-polarized layer is defined by the polarizing (or Brewster) angle of the material(s) from which the fixed-polarized layer is fabricated. The Brewster angle can be determined in accordance with art-recognized methods, such as from the following equation, $$\theta_B = \arctan(n_2/n_1)$$

In the above equation: $\theta_B$ is the Brewster angle of the material from which the fixed-polarized layer is fabricated; $n_1$ is the refractive index of the initial medium through which the electromagnetic radiation (such as visible light) propagates; and $n_2$ is the refractive index of the material from which the fixed-polarized layer is fabricated. The polarizing/Brewster angle is determined with regard to the surface of the fixed-polarized layer that faces the incident electromagnetic radiation.

In accordance with some embodiments, the first polarization axis of the fixed-polarized layer is defined by (or is the result of) the fixed-polarized layer including, at least in part, a guest-host system that includes a lyotropic liquid crystal matrix that acts as a host to a dye, such as a non-dichroic dye, that is disposed within the lyotropic liquid crystal matrix. The dye is oriented by orientation of the lyotropic liquid crystal matrix. The guest-host system can be formed by art-recognized methods, such as by coating an underlying material or substrate with a coating composition that includes a lyotropic liquid crystal matrix material and a dye.

Orientation of the guest-host system can be achieved by art-recognized methods during and/or after formation of the guest-host system, such as by interaction with an external force including, but not limited to, a magnetic field, an electric field, linearly polarized infrared radiation, linearly polarized ultraviolet radiation, linearly polarized visible radiation, and/or shear forces. During and/or after application of the coating composition, and with some embodiments, the liquid crystal matrix material is unilaterally oriented, and correspondingly the dye is also unilaterally oriented along with the liquid crystal matrix material.

The dye of the guest-host system can be selected from art-recognized dyes, such as, but not limited to, acid dyes, basic dyes, direct dyes, reactive dyes, and combinations of two or more thereof. With some embodiments, the dye is selected from one or more pleochroic dyes. A pleochroic dye, and in particular a pleochroic dye molecule, is a molecule that has a light absorption spectrum that varies as a function of the orientation of the molecule with respect to the polarization of incident light.

The lyotropic liquid crystal matrix material of the guest-host system, can be selected from one or more art-recognized materials, such as liquid crystal compounds, including, but not limited to, those liquid crystal compounds described further herein with regard to the optional anisotropic material of the photochromic-dichroic layer, and/or the optional alignment layer. With some embodiments, the lyotropic liquid crystal matrix material includes one or more liquid crystal compounds that include at least one triazine group per molecule. Examples of suitable guest-host systems include, but are not limited to, those described at column 2, line 65 through column 13, line 41 of U.S. Pat. No. 6,245,399 B1, which disclosure is incorporated herein by reference.

The photochromic-dichroic layer can, with some embodiments of the photochromic-dichroic articles of the present invention, be non-polarizing in a first state (that is, the layer will not confine the vibrations of the electric vector of light waves to one direction), and be linearly polarizing in a second state with regard to transmitted radiation. As used herein the term "transmitted radiation" refers to radiation that is passed through at least a portion of an object. Although not limiting herein, the transmitted radiation can be ultraviolet radiation, visible radiation, infrared radiation, or a combination thereof. Thus, according to various non-limiting embodiments disclosed herein, the photochromic-dichroic layer can be non-polarizing in the first state and linearly polarizing in the second state, thereby transmitting linearly polarized ultraviolet radiation, transmitting linearly polarized visible radiation, or a combination thereof in the second state.

According to still other non-limiting embodiments, the photochromic-dichroic layer can have a first absorption spectrum in the first state, a second absorption spectrum in the second state, and can be linearly polarizing in both the first and second states.

With some embodiments, the photochromic-dichroic layer has an average absorption ratio of at least 1.5 in at least one state. With some further embodiments, the photochromic-dichroic layer can independently have an average absorption ratio ranging from at least 1.5 to 50 (or greater) in at least one state. The term "absorption ratio" refers to the ratio of the absorbance of radiation linearly polarized in a first plane to the absorbance of radiation linearly polarized in a plane orthogonal to the first plane, in which the first plane is taken as the plane with the highest absorbance. Thus, the absorption ratio (and the average absorption ratio which is described below) is an indication of how strongly one of two orthogonal plane polarized components of radiation is absorbed by an object or material.

The average absorption ratio of a photochromic-dichroic layer that includes a photochromic-dichroic compound can be determined as set forth below. For example, to determine the average absorption ratio of a photochromic-dichroic layer that includes a photochromic-dichroic compound, a substrate having a layer is positioned on an optical bench and the layer is placed in a linearly polarizing state by activation of the photochromic-dichroic compound. Activation is achieved by exposing the layer to UV radiation for a time sufficient to reach a saturated or near saturated state (that is, a state wherein the absorption properties of the layer do not substantially change over the interval of time during which the measurements are made). Absorption measurements are taken over a period of time (typically 10 to 300 seconds) at 3 second intervals for light that is linearly polarized in a plane perpendicular to the optical bench (referred to as the 0° polarization plane or direction) and light that is linearly polarized in a plane that is parallel to the optical bench (referred to as the 90° polarization plane or direction) in the following sequence: 0°, 90°, 90°, 0° etc. The absorbance of the linearly polarized light by the layer is measured at each time interval for all of the wavelengths tested and the unactivated absorbance (i.e., the absorbance of the coating in an unactivated state) over the same range of wavelengths is subtracted to obtain absorption spectra for the layer in an activated state in each of the 0° and 90° polarization planes to obtain an average difference absorption spectrum in each polarization plane for the coating in the saturated or near-saturated state.

Figure 5:
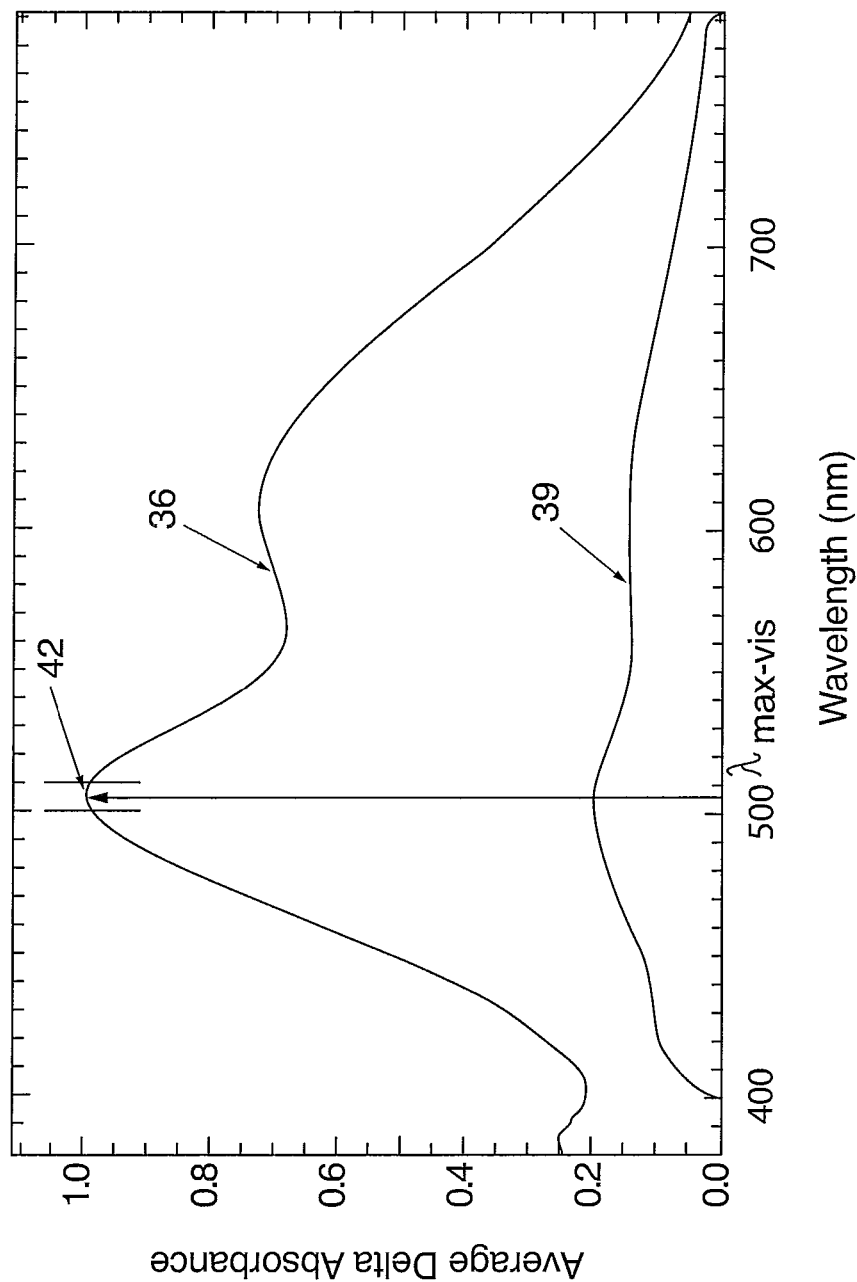
FIG. 5 is a graphical representation of average delta absorbance as a function of wavelength (over a visible wavelength region after activation with actinic radiation), and depicts two average difference absorption spectra obtained in two orthogonal planes for a photochromic-dichroic layer that includes a photochromic-dichroic compound that can be included in the photochromic-dichroic layer of the photochromic-dichroic articles in accordance with some embodiments of the present invention.

For example, with reference to FIG. 5, there is shown the average difference absorption spectrum (generally indicated as 36) in one polarization plane that was obtained for a photochromic-dichroic layer according to one non-limiting embodiment disclosed herein. The average absorption spectrum (generally indicated as 39) is the average difference absorption spectrum obtained for the same photochromic-dichroic layer in the orthogonal polarization plane.

Based on the average difference absorption spectra obtained for the photochromic-dichroic layer, the average absorption ratio for the photochromic-dichroic layer is obtained as follows. The absorption ratio of the photochromic-dichroic layer at each wavelength in a predetermined range of wavelengths corresponding to $\lambda_{max\text{-}vis}$+/−5 nanometers (generally indicated as 42 in FIG. 5), wherein $\lambda_{max\text{-}vis}$ is the wavelength at which the coating had the highest average absorbance in any plane, is calculated according to the following equation (Eq. 1):

$$AR_{\lambda i} = Ab^1_{\lambda i}/Ab^2_{\lambda i} \qquad \text{Eq.1}$$

With reference to equation Eq. 1, $AR_{\lambda i}$ is the absorption ratio at wavelength $\lambda_i$, $Ab^1_{\lambda i}$ is the average absorption at wavelength $\lambda_i$ in the polarization direction (i.e., 0° or 90°) having the higher absorbance, and $Ab^2_{\lambda i}$ is the average absorption at wavelength $\lambda_i$ in the remaining polarization direction. As previously discussed, the "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance.

The average absorption ratio ("AR") for the photochromic-dichroic layer is then calculated by averaging the individual absorption ratios over the predetermined range of wavelengths (i.e., $\lambda_{max\text{-}vis}$+/−5 nanometers) according to the following equation (Eq. 2):

$$AR = (\Sigma AR_{\lambda i})/n_i \qquad \text{Eq. 2}$$

With reference to equation Eq. 2, AR is average absorption ratio for the coating, $AR_{\lambda i}$ are the individual absorption ratios (as determined above in Eq. 1) for each wavelength within the predetermined range of wavelengths, and $n_i$ is the number of individual absorption ratios averaged. A more detailed description of this method of determining the average absorption ratio is provided in the Examples of U.S. Pat. No. 7,256,921 at column 102, line 38 through column 103, line 15, the disclosure of which is specifically incorporated herein by reference.

With some embodiments, the photochromic-dichroic compound of the photochromic-dichroic layer can be at least partially aligned. As previously discussed, the term "photochromic-dichroic" means displaying both photochromic and dichroic (i.e., linearly polarizing) properties under certain conditions, which properties are at least detectible by instrumentation. Accordingly, "photochromic-dichroic compounds" are compounds displaying both photochromic and dichroic (i.e., linearly polarizing) properties under certain conditions, which properties are at least detectible by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed herein, the photochromic-dichroic compounds disclosed herein can be thermally reversible. That is, the photochromic-dichroic compound can switch from a first state to a second state in response to actinic radiation and revert back to the first state in response to thermal energy. As used herein with some embodiments, the term "compound" means a substance formed by the union of two or more elements, components, ingredients, or parts and includes, without limitation, molecules and macromolecules (for example polymers and oligomers) formed by the union of two or more elements, components, ingredients, or parts.

For example, the photochromic-dichroic layer can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the second photochromic-dichroic compound can be linearly polarizing in an activated state and non-polarizing in the bleached or faded state (the not activated or unactivated state). As used herein, the term "activated state" refers to a photochromic-dichroic compound when exposed to sufficient actinic radiation to cause at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Although not required, according to various non-limiting embodiments disclosed herein, the photochromic-dichroic compound of the photochromic-dichroic layers, can have an average absorption ratio of at least 1.5 in an activated state as determined according to the CELL METHOD. According to other non-limiting embodiments disclosed herein, the photochromic-dichroic compound can have an average absorption ratio greater than 2.3 in an activated state as determined according to the CELL METHOD. According to still other non-limiting embodiments, the at least partially aligned photochromic-dichroic compound, of the photochromic-dichroic layer, can have an average absorption ratio ranging from 1.5 to 50 in an activated state as determined according to the CELL METHOD. In accordance with other non-limiting embodiments, the at least partially aligned photochromic-dichroic compound, of the photochromic-dichroic layer, can have an average absorption ratio ranging from 4 to 20, or an average absorption ratio ranging from 3 to 30, or an average absorption ratio ranging from 2.5 to 50 in an activated state as determined according to the CELL METHOD. More typically, however, the average absorption ratio of the at least partially aligned photochromic-dichroic compound can be any average absorption ratio that is sufficient to impart the desired properties to the photochromic-dichroic articles of the present invention. Non-limiting examples of suitable photochromic-dichroic compounds from which the photochromic-dichroic compound can be selected, with some embodiments, are described in detail herein below.

The CELL METHOD for determining the average absorption ratio of a photochromic-dichroic compound is essentially the same as the method used to determine the average absorption ratio of a photochromic-dichroic layer containing such a photochromic-dichroic compound, except that, instead of measuring the absorbance of a coated substrate, a cell assembly containing an aligned liquid crystal material and the photochromic-dichroic compound is tested.

With some embodiments, and for purposes of non-limiting illustration, the cell assembly can include two opposing glass substrates that are spaced apart by 20 microns +/−1 micron. The substrates are sealed along two opposite edges to form a cell. The inner surface of each of the glass substrates is coated with a polyimide coating, the surface of which has been at least partially ordered by rubbing. Alignment of the photochromic-dichroic compound is achieved by introducing the photochromic-dichroic compound and the liquid crystal medium into the cell assembly, and allowing the liquid crystal medium to align with the rubbed polyimide surface. Once the liquid crystal medium and the photochromic-dichroic compound are aligned, the cell assembly is placed on an optical bench (which is described in detail in the Examples) and the average absorption ratio is determined in the manner previously described for the coated substrates, except that the unactivated absorbance of the cell assembly is subtracted from the activated absorbance to obtain the average difference absorption spectra.

While dichroic compounds are capable of preferentially absorbing one of two orthogonal components of plane polarized light, it is generally necessary to suitably position or arrange the molecules of a dichroic compound in order to achieve a net linear polarization effect. Similarly, it is generally necessary to suitably position or arrange the molecules of a photochromic-dichroic compound to achieve a net linear polarization effect. That is, it is generally necessary to align the molecules of a photochromic-dichroic compound such that the long axis of the molecules, of the photochromic-dichroic compound in an activated state, are generally parallel to each other. As such, and in accordance with various non-limiting embodiments disclosed herein, the first and second photochromic-dichroic compounds are each independently at least partially aligned. Further, if the activated state of a photochromic-dichroic compound corresponds to a dichroic state of the material in which it resides, the photochromic-dichroic compound can be at least partially aligned such that the long axis of the molecules of the photochromic-dichroic compound in the activated state are aligned. As used herein the term "align" means to bring into suitable arrangement or position by interaction with another material, compound or structure.

Further, although not limiting herein, the photochromic-dichroic layer can include a plurality of photochromic-dichroic compounds. Although not limiting herein, when two or more photochromic-dichroic compounds are used in combination, the photochromic-dichroic compounds can be chosen to complement one another so as to produce a desired color or hue. For example, mixtures photochromic-dichroic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors. Additionally or alternatively, the photochromic-dichroic layer, of the photochromic-dichroic articles of the present invention, can include mixtures of photochromic-dichroic compounds having complementary linear polarization states. For example, the photochromic-dichroic compounds, of the photochromic-dichroic layer, can be chosen to have complementary linear polarization states over a desired range of wavelengths so as to provide a photochromic-dichroic article that is capable of polarizing light over the desired range of wavelengths. Still further, mixtures of complementary photochromic-dichroic compounds having essentially the same polarization states at the same wavelengths can be chosen to reinforce or enhance the overall linear polarization achieved. For example, according to some non-limiting embodiments, the photochromic-dichroic layer, of the photochromic-dichroic articles of the present invention, can include at least two at least partially aligned photochromic-dichroic compounds, in which each of the at least partially aligned photochromic-dichroic compounds have: complementary colors; and/or complementary linear polarization states.

The photochromic-dichroic layer can further include at least one additive that can facilitate one or more of the processing, the properties, or the performance of such layer. Non-limiting examples of such conventional additives include dyes, alignment promoters, horizontal alignment agents, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of dyes that can be present in the photochromic-dichroic layer include, but are not limited to, organic dyes that are capable of imparting a desired color or other optical property to the photochromic-dichroic layer.

As used herein, the term "alignment promoter" means an additive that can facilitate at least one of the rate and uniformity of the alignment of a material to which it is added. Non-limiting examples of alignment promoters that can be present in the first and/or second photochromic-dichroic layers include, but are not limited to, those described in U.S. Pat. No. 6,338,808 and U.S. Patent Publication No. 2002/0039627, which are hereby specifically incorporated by reference herein.

Horizontal alignment (or orientation) agents that can be used with some embodiments of the present invention assist in aligning the longitudinal axis of a photochromic-dichroic compound substantially parallel to a horizontal plane of the photochromic-dichroic layer. Examples of horizontal alignment agents that can be used with some embodiments of the present invention include, but are not limited to, those disclosed at column 13, line 58 through column 23, line 2 of U.S. Pat. No. 7,315,341 B2, which disclosure is incorporated herein by reference.

Non-limiting examples of kinetic enhancing additives that can be present in the various layers of the photochromic-dichroic article of the present invention, such as the photochromic-dichroic layer, include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein.

Non-limiting examples of photoinitiators that can be present in the various layers of the photochromic-dichroic article of the present invention, such as the photochromic-dichroic layer, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in one or more of the layers of the photochromic-dichroic article of the present invention, such as the photochromic-dichroic layer, is a visible light photoinitiator. Non-limiting examples of suitable visible light photoinitiators are disclosed at column 12, line 11 to column 13, line 21 of U.S. Pat. No. 6,602,603, which is specifically incorporated by reference herein.

Examples of thermal initiators include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl)peroxydicarbonate, di(secondary butyl)peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of solvents that can be present in forming the various layers of the photochromic-dichroic articles of the present invention, such as the photochromic-dichroic layer, include, but are not limited to, those that can dissolve solid components of the coating, that are compatible with the coating and the elements and substrates, and/or can ensure uniform coverage of the exterior surface(s) to which the coating is applied. Examples of solvents include, but are not limited to, the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

In another non-limiting embodiment, the photochromic-dichroic layer can include at least one conventional dichroic compound. Examples of suitable conventional dichroic compounds include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly) azo dyes, benzoquinones, naphthoquinones, anthraquinone and (poly)anthraquinones, anthrapyrimidinones, iodine and iodates. In another non-limiting embodiment, the dichroic material can include at least one reactive functional group that is capable of forming at least one covalent bond with another materials. With some embodiments, the dichroic material can be a polymerizable dichroic compound. Correspondingly, the dichroic material can include at least one group that is capable of being polymerized (i.e., a "polymerizable group"). For example, although not limiting herein, in one non-limiting embodiment the dichroic compound can have at least one alkoxy, polyalkoxy, alkyl, or polyalkyl substituent terminated with at least one polymerizable group.

If present and in accordance with some embodiments, the conventional dichroic compound can be present, in the photochromic-dichroic layer, in an amount of at least 0.001 percent by weight and less than or equal to 10.0 percent by weight, such as from 0.01 to 5.0 percent by weight, or from 0.1 to 2.5 percent by weight, in which the percent weights are in each case based on total weight of the photochromic-dichroic layer.

With some embodiments, the photochromic-dichroic layer can include at least one conventional photochromic compound. As used herein, the term "conventional photochromic compound" includes both thermally reversible and non-thermally reversible (such as actinic light reversible, such as photo-reversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

If present and in accordance with some embodiments, the conventional photochromic compound can be present, in the photochromic-dichroic layer, in an amount of at least 0.001 percent by weight and less than or equal to 10.0 percent by weight, such as from 0.01 to 5.0 percent by weight, or from 0.1 to 2.5 percent by weight, in which the percent weights are in each case based on total weight of the photochromic-dichroic layer.

In accordance with some embodiments, the photochromic-dichroic layer is free of conventional photochromic compounds and/or conventional dichroic compounds.

The photochromic-dichroic layer can include one or more suitable photochromic-dichroic compounds. Examples of photochromic-dichroic compounds from which the photochromic-dichroic compound can be selected include, but are not limited to, the following:

(PCDC-1) 3-phenyl-3-(4-(4-(3-piperidin-4-yl-propyl)piperidino)phenyl)-13,13-dimethyl-3H,13-indeno[2',3':3,4] naphtho[1,2-b]pyran;

(PCDC-2) 3-phenyl-3-(4-(4-(3-(1-(2-hydroxyethyl)piperidin-4-yl)propyl)piperidino)phenyl)-13,13-dimethyl-3H,13H-indeno[2,3':3,4]naphtho[1,2-b]pyran;

(PCDC-3) 3-phenyl-3-(4-(4-(4-butyl-phenylcarbamoyl)-piperidin-1-yl)phenyl)-13,13-dimethyl-6-methoxy-7-(4-phenyl-piperazin-1-yl)-3H,13H-indeno[2',3':3,4]naphtho[1,2-b]pyran;

(PCDC-4) 3-phenyl-3-(4-([1,4]bipiperidinyl-1'-yl)phenyl)-13,13-dimethyl-6-methoxy-7-([1,4']bipiperidinyl-1'-yl)-3H,13H-indeno[2',3':3,4]naphtho[1,2-b]pyran;

(PCDC-5) 3-phenyl-3-(4-(4-phenyl-piperazin-1-yl)phenyl)-13,13-dimethyl-6-methoxy-7-(4-(4-hexylbenzoyloxy)-piperidin-1-yl)-3H,13H-indeno[2,3':3,4]naphtho[1,2-b]pyran;

(PCDC-6) 3-phenyl-3-(4-(4-phenyl-piperazin-1-yl)phenyl)-13,13-dimethyl-6-methoxy-7-(4-(4'-octyloxy-biphenyl-4-carbonyloxy)-piperidin-1-yl)-3H,13H-indeno[2',3':3,4]naphtho[1,2-b]pyran;

(PCDC-7) 3-phenyl-3-(4-(4-phenyl-piperazin-1-yl)phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-3H,13H-indeno[2',3':3,4]naphtho[1,2-b]pyran;

(PCDC-8) 3-phenyl-3-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-3H,13H-indeno[2',3':3,4]naphtho[1,2-b]pyran;

(PCDC-9) 3-phenyl-3-(4-(4-phenylpiperazin-1-yl)phenyl)-13,13-dimethyl-6-methoxy-7-(4-(4-(4'-octyloxy-biphenyl-4-carbonyloxy)phenyl)piperazin-1-yl)-3H,13H-indeno[2',3':3,4]naphtho[1,2-b]pyran;

(PCDC-10) 3-phenyl-3-(4-(4-phenyl-piperazin-1-yl)phenyl)-13,13-dimethyl-6-methoxy-7-(4-(4-(4-hexyloxyphenylcarbonyloxy)phenyl)piperazin-1-yl)-3H,13H-indeno[2',3':3,4]naphtho[1,2-b]pyran;

(PCDC-11) 3-phenyl-3-(4-(4-phenyl-piperazin-1-yl)phenyl)-13,13-dimethyl-6-methoxy-7-(4-(4-(4-(2-fluorobenzoyloxy)benzoyloxy)phenyl)piperazin-1-yl)-3H,13H-indeno[2',3':3,4]naphtho[1,2-b]pyran;

(PCDC-12) 3-phenyl-3-(4-(pyrrolidin-1-yl)phenyl)-β-hydroxy-13-ethyl-6-methoxy-7-(4-(4-(4-hexylbenzoyloxy)phenyl)piperazin-1-yl)-3H,13H-indeno[2',3':3,4]naphtho[1,2-b]pyran;

(PCDC-13) 3-phenyl-3-(4-(pyrrolidin-1-yl)phenyl)-13,13-dimethyl-6-methoxy-7-(4-(4-hexylbenzoyloxy)benzoyloxy)-3H,13H-indeno[2',3':3,4]naphtho[1,2-b]pyran;

(PCDC-14) 3-phenyl-3-(4-(pyrrolidin-1-yl)phenyl)-13,13-dimethyl-6-methoxy-7-(4-(4-(4-hexylbenzoyloxy)benzoyloxy)benzoyloxy)-3H,13H-indeno[2,3':3,4]naphtho[1,2-b]pyran;

(PCDC-15) 3-phenyl-3-(4-(4-methoxyphenyl)-piperazin-1-yl))phenyl)-13,13-dimethyl-6-methoxy-7-(4-(4-(3-phenylprop-2-ynoyloxy)phenyl)piperazin-1-yl)-3H,13H-indeno[2',3':3,4]naphtho[1,2-b]pyran;

(PCDC-16) 3-(4-methoxyphenyl)-3-(4-(4-methoxyphenyl)piperazin-1-yl)phenyl)-13-ethyl-13-hydroxy-6-methoxy-7-(4-(4-(4-hexylbenzoyloxy)phenyl)piperazin-1-yl)-3H,13H-indeno[2,3':3,4]naphtho[1,2-b]pyran;

(PCDC-17) 3-phenyl-3-{4-(pyrrolidin-1-yl)phenyl}-13-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxy]-13-ethyl-6-methoxy-7-(4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperadin-1-yl)-3H,13H-indeno[2',3':3,4]naphtho[1,2-b]pyran;

(PCDC-18) 3-phenyl-3-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13-ethyl-13-hydroxy-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-)-3H,13H-indeno[2',3':3,4]naphtho[1,2-b]pyran;

(PCDC-19) 3-phenyl-3-{4-(pyrrolidin-1-yl)phenyl)-13,13-dimethyl-6-methoxy-7-(4-(4-(4-(3-phenyl-3-{4-(pyrrolidin-1-yl)phenyl}-13,13-dimethyl-6-methoxy-indeno[2',3':3,4]naphtho[1,2-b]pyran-7-yl)-piperadin-1-yl)oxycarbonyl)phenyl)phenyl)carbonyloxy)-3H,13H-indeno[2',3':3,4]naphtho[1,2-b]pyran;

(PCDC-20) 3-{2-methylphenyl}-3-phenyl-5-(4-(4'-(trans-4-pentylcyclohexyl)-[1,1'-biphenyl]-4-ylcarboxamido)phenyl)-3H-naphtho[2,1-b]pyran;

(PCDC-21) 3-{4-[4-(4-methoxy-phenyl)-piperazin-1-yl]-phenyl}-3-phenyl-7-(4-(4'-(trans-4-pentylcyclohexyl)-[1,1'-biphenyl]-4-ylcarboxamido)phenyl)-3H-naphtho[2,1-b]pyran;

(PCDC-22) 3-{4-[4-(4-methoxy-phenyl)-piperazin-1-yl]-phenyl}-3-phenyl-7-(4-phenyl-(phen-1-oxy)carbonyl)-3H-naphtho[2,1-b]pyran;

(PCDC-23) 3-{4-[4-(4-methoxy-phenyl)-piperazin-1-yl]-phenyl}-3-phenyl-7-(N-(4-((4-dimethylamino)phenyl)diazenyl)phenyl)carbamoyl-3H-naphtho[2,1-b]pyran;

(PCDC-24) 2-phenyl-2-{4-[4-(4-methoxy-phenyl)-piperazin-1-yl]-phenyl}-benzofuro[3',2':7,8]benzo[b]pyran;

(PCDC-25) 2-phenyl-2-{4-[4-(4-methoxy-phenyl)-piperazin-1-yl]-phenyl}-7-(4-(4'-(trans-4-pentylcyclohexyl)-[1,1'-biphenyl]-4-ylcarboxamido)phenyl)-benzothieno[3',2':7,8]benzo[b]pyran;

(PCDC-26) 7-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}-2-phenyl-2-(4-pyrrolidin-1-yl-phenyl)-6-methoxycarbonyl-2H-benzo[b]pyran;

(PCDC-27) 2-phenyl-2-{4-[4-(4-methoxy-phenyl)-piperazin-1-yl]-phenyl}-9-hydroxy-8-methoxycarbonyl-2H-naphtho[1,2-b]pyran;

(PCDC-28) 2-phenyl-2-{4-[4-(4-methoxy-phenyl)-piperazin-1-yl]-phenyl}-9-hydroxy-8-(N-(4-butyl-phenyl))carbamoyl-2H-naphtho[1,2-b]pyran;

(PCDC-29) 2-phenyl-2-{4-[4-(4-methoxy-phenyl)-piperazin-1-yl]-phenyl}-9-hydroxy-8-(4-(4'-(trans-4-pentylcyclohexyl)-[1,1'-biphenyl]-4-ylcarboxamido)phenyl)-2H-naphtho[1,2-b]pyran;

(PCDC-30) 1,3,3-trimethyl-6'-(4-ethoxycarbonyl)-piperidin-1-yl)-spiro[indoline-2,3'-3H-naphtho[2,1-b][1,4]oxazine];

(PCDC-31) 1,3,3-trimethyl-6'-(4-[N-(4-butylphenyl)carbamoyl]-piperidin-1-yl)-spiro[indoline-2,3'-3H-naphtho[2,1-b][1,4]oxazine];

(PCDC-32) 1,3,3-trimethyl-6'-(4-(4-methoxyphenyl)piperazin-1-yl)-spiro[indoline-2,3'-3H-naphtho[2,1-b][1,4]oxazine];

(PCDC-33) 1,3,3-trimethyl-6'-(4-(4'-(trans-4-pentylcyclohexyl)-[1,1'-biphenyl]-4-ylcarboxamido)phenyl)-spiro[indoline-2,3'-3H-naphtho[2,1-b][1,4]oxazine];

(PCDC-34) 1,3,3,5,6-pentamethyl-7'-(4-(4'-(trans-4-pentyl-cyclohexyl)-[1,1'-biphenyl]-4-ylcarboxamido)phenyl))-spiro[indoline-2,3'-3H-naphtho[2,1-b][1,4]oxazine];

(PCDC-35) 1,3-diethyl-3-methyl-5-methoxy-6'-(4-(4'-Hexyloxy-biphenyl-4-carbonyloxy)-piperidin-1-yl)-spiro[indoline-2,3'-3H-naphtho[2,1-b][1,4]oxazine];

(PCDC-36) 1,3-diethyl-3-methyl-5-[(4-pentadecafluoroheptyloxy-phenylcarbamoyl)-benzyloxy]-6'-(4-(4'-hexyloxy-biphenyl-4-carbonyloxy)-piperidin-1-yl)-spiro[indoline-2,3'-3H-naphtho[2,1-b][1,4]oxazine];

(PCDC-37) 2-phenyl-2-{4-[4-(4-methoxy-phenyl)-piperazin-1-yl]-phenyl}-5-carbomethoxy-8-(N-(4-phenyl)phenyl)carbamoyl-2H-naphtho[1,2-b]pyran;

(PCDC-38) 2-phenyl-2-{4-[4-(4-methoxy-phenyl)-piperazin-1-yl]-phenyl}-5-carbomethoxy-8-(N-(4-phenyl)phenyl)carbamoyl-2H-fluoantheno[1,2-b]pyran;

(PCDC-39) 2-phenyl-2-{4-[4-(4-methoxy-phenyl)-piperazin-1-yl]-phenyl}-5-carbomethoxy-1'-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)-2H-fluoantheno[1,2-b]pyran;

(PCDC-40) 1-(4-carboxybutyl)-6-(4-(4-propylphenyl)carbonyloxy)phenyl)-3,3-dimethyl-6'-(4-ethoxycarbonyl)-piperidin-1-yl)-spiro[(1,2-dihydro-9H-dioxolano[4',5':6,7]indoline-2,3'-3H-naphtho[2,1-b][1,4]oxazine];

(PCDC-41) 1-(4-carboxybutyl)-6-(4-(4-propylphenyl)carbonyloxy)phenyl)-3,3-dimethyl-7'-(4-ethoxycarbonyl)-piperidin-1-yl)-spiro[(1,2-dihydro-9H-dioxolano[4',5':6,7]indoline-2,3'-3H-naphtho[1,2-b][1,4]oxazine];

(PCDC-42) 1,3-diethyl-3-methyl-5-(4-{17-(1,5-dimethylhexyl)-10,13-dimethyl-2,3,4,7,8,9,10,11,12,13,14,15,16,17-tetradecahydro-1H-cyclopenta[a]phenanthren-3-yloxycarbonyloxy}phenyl)-6'-(4-(4'-hexyloxy-biphenyl-4-carbonyloxy)-piperidin-1-yl)-spiro[indoline-2,3'-3H-naphtho[2,1-b][1,4]oxazine];

(PCDC-43) 1-butyl-3-ethyl-3-methyl-5-methoxy-7'-(4-(4'-Hexyloxy-biphenyl-4-carbonyloxy)-piperidin-1-yl)-spiro[indoline-2,3'-3H-naphtho[1,2-b][1,4]oxazine];

(PCDC-44) 2-phenyl-2-{4-[4-(4-methoxy-phenyl)-piperazin-1-yl]-phenyl}-5-methoxycarbonyl-6-methyl-2H-9-(4-(4-propylphenyl)carbonyloxy)phenyl)-(1,2-dihydro-9H-dioxolano[4',5':6,7]) naphtho[1,2-b]pyran;

(PCDC-45) 3-(4-methoxyphenyl)-3-(4-(4-methoxyphenyl)piperazin-1-yl)phenyl)-13-ethyl-13-hydroxy-6-methoxy-7-(4-(4-propylphenyl)carbonyloxy)phenyl)-3H,13H-[1,2-dihydro-9H-dioxolano[4'',5'':6,7][indeno[2',3':3,4]]naphtho[1,2-b]pyran;

(PCDC-46) 3-phenyl-3-(4-(4-methoxyphenyl)piperazin-1-yl)phenyl)-13-ethyl-13-hydroxy-6-methoxy-7-(4-(4-hexylphenyl)carbonyloxy)phenyl)-3H,13H-[1,2-dihydro-9H-dioxolano[4'',5'':5,6][indeno[2',3':3,4]]naphtho[1,2-b]pyran;

(PCDC-47) 4-(4-((4-cyclohexylidene-1-ethyl-2,5-dioxopyrrolin-3-ylidene)ethyl)-2-thienyl)phenyl-(4-propyl)benzoate;

(PCDC-48) 4-(4-((4-adamantan-2-ylidene-1-(4-(4-hexylphenyl)carbonyloxy)phenyl)-2,5-dioxopyrrolin-3-ylidene)ethyl)-2-thienyl)phenyl-(4-propyl)benzoate;

(PCDC-49) 4-(4-((4-adamantan-2-ylidene-2,5-dioxo-1-(4-(4-(4-propylphenyl)piperazinyl)phenyl)pyrrolin-3-ylidene)ethyl)-2-thienyl)phenyl(4-propyl)benzoate;

(PCDC-50) 4-(4-((4-adamantan-2-ylidene-2,5-dioxo-1-(4-(4-(4-propylphenyl)piperazinyl)phenyl)pyrrolin-3-ylidene)ethyl)-1-methylpyrrol-2-yl)phenyl(4-propyl)benzoate;

(PCDC-51) 4-(4-((4-adamantan-2-ylidene-2,5-dioxo-1-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)pyrrolin-3-ylidene)ethyl)-1-methylpyrrol-2-yl)phenyl(4-propyl) benzoate;

(PCDC-52) 4-(4-methyl-5,7-dioxo-6-(4-(4-(4-propylphenyl)piperazinyl)phenyl)spiro[8,7a-dihydrothiapheno[4,5-f]isoindole-8,2'-adamantane]-2-yl)phenyl(4-propyl)phenyl benzoate;

(PCDC-53) N-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl-6,7-dihydro-4-methyl-2-phenylspiro(5,6-benzo[b]thiophenedicarboxylmide-7,2-tricyclo[3.3.1.1]decane);

(PCDC-54) N-cyanomethyl-6,7-dihydro-2-(4-(4-(4-propylphenyl)piperazinyl)phenyl)-4-methylspiro(5,6-benzo[b]thiophenedicarboxylmide-7,2-tricyclo[3.3.1.1]decane);

(PCDC-55) N-phenylethyl-6,7-dihydro-2-(4-(4-(4-hexylbenzoyloxy)phenyl)piperazin-1-yl)phenyl-4-methylspiro(5,6-benzo[b]thiophenedicarboxylmide-7,2-tricyclo[3.3.1.1]decane);

(PCDC-56) N-phenylethyl-6,7-dihydro-2-(4-(4-(4-hexylbenzoyloxy)phenyl)piperazin-1-yl)phenyl-4-cyclopropylspiro(5,6-benzo[b]thiophenedicarboxylmide-7,2-tricyclo[3.3.1.1]decane);

(PCDC-57) N-phenylethyl-6,7-dihydro-2-(4-(4-(4-hexylbenzoyloxy)phenyl)piperazin-1-yl)phenyl-4-cyclopropylspiro(5,6-benzo[b]furodicarboxylmide-7,2-tricyclo[3.3.1.1]decane);

(PCDC-58) N-cyanomethyl-6,7-dihydro-4-(4-(4-(4-hexylbenzoyloxy)phenyl)piperazin-1-yl)phenyl-2-phenylspiro(5,6-benzo[b]thiophenedicarboxylmide-7,2-tricyclo[3.3.1.1]decane);

(PCDC-59) N-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyl-6,7-dihydro-2-(4-methoxyphenyl)phenyl-4-methylspiro(5,6-benzo[b]thiophenedicarboxylmide-7,2-tricyclo[3.3.1.1]decane);

(PCDC-60) N-cyanomethyl-2-(4-(6-(4-butylphenyl)carbonyloxy-(4,8-dioxabicyclo[3.3.0]oct-2-yl))oxycarbonyl)phenyl-6,7-dihydro-4-cyclopropylspiro(5,6-benzo[b]thiophenedicarboxylmide-7,2-tricyclo[3.3.1.1]decane);

(PCDC-61) 6,7-dihydro-N-methoxycarbonylmethyl-4-(4-(6-(4-butylphenyl)carbonyloxy-(4,8-dioxabicyclo[3.3.0]oct-2-yl))oxycarbonyl)phenyl-2-phenylspiro(5,6-benzo[b]thiophenedicarboxylmide-7,2-tricyclo[3.3.1.1] decane); and (PCDC-62) 3-phenyl-3-(4-pyrrolidinylphenyl)-13,13-dimethyl-6-methoxy-7-(4-(4-(4-(6-(4-(4-(4-onylphenylcabonyloxy)phenyl)oxycarbonyl)phenoxy)hexyloxy)phenyl)piperazin-1-yl)indeno[2',3':3,4]naphtho[1,2-b]pyran.

With some further embodiments, the photochromic-dichroic compounds of the photochromic-dichroic articles of the present invention, can be chosen from one or more of the following:

(PCDC-a1) 3,3-Bis(4-methoxyphenyl)-10-[4-(4-(trans-4-pentylcyclohexyl)benzamido)phenyl]-13,13-dimethyl-12-bromo-3,13-dihydro-indeno[2,3':3,4]naphtho[1,2-b] pyran;

(PCDC-a2) 3,3-Bis(4-methoxyphenyl)-10-[4-((trans-4-pentylcyclohexyl)phenoxy)carbonyl)phenyl]-6,13,13-trimethyl-3,13-dihydro-indeno[2',3':3,4]naphtho[1,2-b]pyran;

(PCDC-a3) 3-(4-Fluorophenyl)-3-(4-piperidinophenyl)-10-[4-(4-(4-(trans-4-pentylcyclohexyl)phenyl)benzamido)

phenyl]-6-trifluoromethyl-11,13,13-trimethyl-3,13-dihydro-indeno[2,3':3,4]naphtho[1,2-b]pyran;

(PCDC-a4) 3,3-Bis(4-methoxyphenyl)-10-[4-(4-(trans-4-pentylcyclohexyl)benzamido)phenyl]-5,7-difluoro-13,13-dimethyl-3,13-dihydro-indeno[2',3':3,4]naphtho[1,2-b]pyran;

(PCDC-a5) 3-(4-Methoxyphenyl)-3-(4-piperidinophenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a6) 3-(4-Methoxyphenyl)-3-(4-morpholinophenyl)-10-[4-(4-(4-(trans-4-pentylcyclohexyl)phenyl)benzamido)phenyl]-5,7-difluoro-13,13-dimethyl-3,13-dihydro-indeno[2,3':3,4]naphtho[1,2-b]pyran;

(PCDC-a7) 3-(4-Fluorophenyl)-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a8) 3-Phenyl-3-(4-piperidinophenyl)-10-[4-(4-(4-(trans-4-pentylcyclohexyl)phenyl)benzamido)phenyl]-12-bromo-5,7-difluoro-13,13-dimethyl-3,13-dihydro-indeno[2',3':3,4]naphtho[1,2-b]pyran;

(PCDC-a9) 3-Phenyl-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a10) 3-(4-Fluorophenyl)-3-(4-piperidinophenyl)-10-[4-(4-(4-(trans-4-pentylcyclohexyl)phenyl)benzamido)phenyl]-12-bromo-13,13-dimethyl-3,13-dihydro-indeno[2',3':3,4]naphtho[1,2-b]pyran;

(PCDC-a11) 3,3-Bis(4-methoxydinophenyl)-10-[4-(4-(4-(trans-4-pentylcyclohexyl)phenyl)benzamido)phenyl]-12-bromo-6,7-dimethoxy-11,13,13-trimethyl-3,13-dihydro-indeno[2',3':3,4]naphtho[1,2-b]pyran;

(PCDC-a12) 3,3-Bis(4-methoxyphenyl)-10-[4-(4-(4-(trans-4-pentylcyclohexyl)phenyl)benzamido)phenyl]-6-trifluoromethyl-12-bromo-13,13-dimethyl-3,13-dihydro-indeno[2',3':3,4]naphtho[1,2-b]pyran;

(PCDC-a13) 3,3-Bis(4-methoxyphenyl)-10,12-bis[4-(4-(4-(trans-4-pentylcyclohexyl)phenyl)benzamido)phenyl]-6-trifluoromethyl-13,13-dimethyl-3,13-dihydro-indeno[2,3':3,4]naphtho[1,2-b]pyran;

(PCDC-a14) 3,3-Bis(4-methoxyphenyl)-10-[4-(4-(4-(trans-4-pentylcyclohexyl)phenyl)benzamido)phenyl]-5,7-difluoro-13,13-dimethyl-3,13-dihydro-indeno[2,3':3,4]naphtho[1,2-b]pyran;

(PCDC-a15) 3,3-Bis(4-methoxyphenyl)-10-[4-(4-(4-(trans-4-pentylcyclohexyl)phenyl)benzamido)phenyl]-6-trifluoromethyl-13,13-dimethyl-3,13-dihydro-indeno[2,3':3,4]naphtho[1,2-b]pyran;

(PCDC-a16) 3,3-Bis(4-methoxyphenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;

(PCDC-a17) 3-(4-Fluorophenyl)-3-(4-morpholinophenyl)-10-[4-(4-(4-(trans-4-pentylcyclohexyl)phenyl)benzamido)phenyl]-6-trifluoromethyl-13-methyl-13-butyl-3,13-dihydro-indeno[2',3':3,4]naphtho[1,2-b]pyran;

(PCDC-a18) 3-(4-Fluorophenyl)-3-(4-morpholinophenyl)-10-[4-(4-(4-(trans-4-pentylcyclohexyl)phenyl)benzamido)phenyl]-5,7-difluoro-12-bromo-13,13-dimethyl-3,13-dihydro-indeno[2,3':3,4]naphtho[1,2-b]pyran;

(PCDC-a19) 3-Phenyl-3-(4-methoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a20) 3-Phenyl-3-(4-morpholinophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a21) 3,3-Bis(4-fluorophenyl)-10-[4-(4-(4-(trans-4-pentylcyclohexyl)phenyl)benzamido)phenyl]-6-trifluoromethyl-12-bromo-13,13-dimethyl-3,13-dihydro-indeno[2,3':3,4]naphtho[1,2-b]pyran;

(PCDC-a22) 3,3-Bis(4-fluorophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a23) 3-(4-Methoxyphenyl)-3-(4-butoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a24) 3-(4-Fluorophenyl)-13,13-dimethyl-3-(4-morpholinophenyl)-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a25) 3-(4-Butoxyphenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a26) 3-(4-(4-(4-Methoxyphenyl)piperazin-1-yl)phenyl)-13,13-dimethyl-10-(4-(4'-(trans-4-pentylcyclohexyl)-[1,1'-biphenyl]-4-ylcarboxamido)phenyl)-3-phenyl-6-(trifluoromethyl)-3,13-dihydro-indeno[2,3':3,4]naphtho[1,2-b]pyran;

(PCDC-a27) 3-(4-Butoxyphenyl)-3-(4-fluorophenyl)-13,13-dimethyl-10-(4-(((trans,trans-4'-pentyl-[1,1'-bi(cyclohexan)]-4-yl)oxy)carbonyl)phenyl)-6-(trifluoromethyl)-3,13-dihydro-indeno[2,3':3,4]naphtho[1,2-b]pyran;

(PCDC-a28) 3-(4-Fluorophenyl)-13-hydroxy-13-methyl-10-(4-(4'-(trans-4-pentylcyclohexyl)-[1,1'-biphenyl]-4-ylcarboxamido)phenyl)-3-(4-butoxyphenyl)-6-(trifluoromethyl)-3,13-dihydro indeno[2,3':3,4]naphtho[1,2-b]pyran;

(PCDC-a29) 3-(4-Methoxyphenyl)-13,13-dimethyl-10-(4-(4'-(trans-4-pentylcyclohexyl)-[1,1'-biphenyl]-4-ylcarboxamido)phenyl)-3-(4-(trifluoromethoxy)phenyl)-6-(trifluoromethyl)-3,13-dihydro-indeno[2',3':3,4]naphtho[1,2-b]pyran;

(PCDC-a30) 3,3-Bis(4-hydroxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a31) 3-(4-morpholinophenyl)-3-phenyl-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a32) 3-(4-morpholinophenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2,3':3,4]naphtho[1,2-b]pyran;

(PCDC-a40) 12-Bromo-3-(4-butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;

(PCDC-a41) 3-(4-Butoxyphenyl)-5,7-dichloro-1'-methoxy-3-(4-methoxyphenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a42) 3-(4-Butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;
(PCDC-a43) 5,7-Dichloro-3,3-bis(4-hydroxyphenyl)-1'-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a44) 6,8-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a45) 3-(4-Butoxyphenyl)-5,8-difluoro-3-(4-fluorophenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;
(PCDC-a46) 3-(4-Butoxyphenyl)-3-(4-fluorophenyl)-13,13-dimethyl-10-(4-(4'-(trans-4-pentylcyclohexyl)-[1,1'-biphenyl]-4-carbonyl)piperazin-1-yl)-6-(trifluoromethyl)-3,13-dihydro-indeno[2',3':3,4]naphtho[1,2-b]pyran;
(PCDC-a47) 3-(4-Morpholinophenyl)-3-(4-methoxyphenyl)-10,7-bis[4-(4-(4-(trans-4-pentylcyclohexyl)phenyl)benzamido)phenyl]-5-fluoro-13,13-dimethyl-3,13-dihydro-indeno[2',3':3,4]naphtho[1,2-b]pyran;
(PCDC-a48) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;
(PCDC-a49) 3,3-Bis(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;
(PCDC-a50) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;
(PCDC-a51) 3,3-Bis(4-methoxyphenyl)-13,13-dimethyl-10-(2-methyl-4-(trans-4-((4'-((trans-4-pentylcyclohexyl)biphenyl-4-yloxy)carbonyl)cyclohexanecarboxamido)phenyl)-3,13-dihydro-indeno[2,3':3,4]naphtho[1,2-b]pyran;
(PCDC-a52) 3-(4-(4-(4-Butylphenyl)piperazin-1-yl)phenyl)-3-(4-methoxyphenyl)-13,13-dimethyl-10-(4-(4'-(trans-4-pentylcyclohexyl)biphenyl-4-ylcarboxamido)-2-(trifluoromethyl)phenyl)-3,13-dihydro-indeno[2',3':3,4]naphtho[1,2-b]pyran;
(PCDC-a53) 3-(4-(4-(4-Butylphenyl)piperazin-1-yl)phenyl)-3-(4-methoxyphenyl)-13,13-dimethyl-10-(2-methyl-4-(4'-(trans-4-pentylcyclohexyl)biphenyl-4-ylcarboxamido)phenyl)-7-(4-(4-(trans-4-pentylcyclohexyl)benzamido)phenyl)-3,13-dihydro-indeno[2',3':3,4]naphtho[1,2-b]pyran;
(PCDC-a54) 3-(4-Methoxyphenyl)-13,13-dimethyl-7,10-bis(4-(4'-(trans-4-pentylcyclohexyl)biphenyl-4-ylcarboxamido)phenyl)-3-phenyl-3,13-dihydro-indeno[2',3':3,4]naphtho[1,2-b]pyran;
(PCDC-a55) 3-p-Tolyl-3-(4-methoxyphenyl)-6-methoxy-13,13-dimethyl-7-(4'-(trans,trans-4'-pentylbi(cyclohexane-4-)carbonyloxy)biphenylcarbonyloxy)-10-(4-(4'-(trans-4-pentylcyclohexyl)biphenyl-4-ylcarboxamido)phenyl)-3,13-dihydro-indeno[2',3':3,4]naphtho[1,2-b]pyran;
(PCDC-a56) 10-(4-(((3S,8S,9S,10R,13R,14S,17R)-10,13-Dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl)-3-(4-methoxyphenyl)-13,13-dimethyl-3-(4-morpholinophenyl)-3,13-dihydro-indeno[2',3':3,4]naphtho[1,2-b]pyran;

(PCDC-a57) 6-Methoxy-3-(4-methoxyphenyl)-13,13-dimethyl-3-(4-((S)-2-methylbutoxy)phenyl)-10-(4-(4'-(trans-4-pentylcyclohexyl)biphenyl-4-ylcarboxamido)phenyl)-3,13-dihydro-indeno[2,3':3,4]naphtho[1,2-b]pyran;
(PCDC-a58) 6-Methoxy-3-(4-methoxyphenyl)-13,13-dimethyl-3-(4-((S)-2-methylbutoxy)phenyl)-7-(4'-(trans,trans-4'-pentylbi(cyclohexane-4-) carbonyloxy)biphenylcarbonyloxy)-10-(4-(4'-(trans-4-pentylcyclohexyl)biphenyl-4-ylcarboxamido)phenyl)-3,13-dihydro-indeno[2,3':3,4]naphtho[1,2-b]pyran; and
(PCDC-a59) 6-Methoxy-3-(4-methoxyphenyl)-13,13-dimethyl-3-(4-((S)-2-methylbutoxy)phenyl)-10-(4-(((3R,3aS,6S,6aS)-6-(4'-(trans-4-pentylcyclohexyl)biphenylcarbonyloxy)hexahydrofuro[3,2-b]furan-3-yloxy)carbonyl)phenyl)-3,13-dihydro-indeno[2',3':3,4]naphtho[1,2-b]pyran.

With some further embodiments, the photochromic-dichroic compounds of the photochromic-dichroic articles of the present invention, can be chosen from the following:
(PCDC-b1) 3-(4-fluorophenyl)-3-(4-(piperidin-1-yl)phenyl)-13-methoxy-13-ethyl-6-methoxy-7-(4'-((4-(trans-4-pentylcyclohexyl)benzoyl)oxy)-[1,1'-biphenyl]-4-carbonyloxy)-3,13-dihydro-indeno[2',3':3,4]naphtho[1,2-b]pyran;
(PCDC-b2) 3-(4-fluorophenyl)-3-(4-(piperidin-1-yl)phenyl)-13-methoxy-13-ethyl-6-methoxy-7-(4-(4'-(4-(trans-4-pentylcyclohexyl)-[1,1'-biphenyl]-4-carbonyloxy)benzoyloxy))-3,13-dihydro-indeno[2',3':3,4]naphtho[1,2-b]pyran;
(PCDC-b3) 3,3-bis(4-methoxyphenyl)-13-methoxy-13-ethyl-6-methoxy-7-(4'-((4-(trans-4-pentylcyclohexyl)benzoyl)oxy)-[1,1'-biphenyl]-4-carbonyloxy)-3,13-dihydro-indeno[2',3':3,4]naphtho[1,2-b]pyran;
(PCDC-b4) 3,3-bis(4-methoxyphenyl)-13-methoxy-13-ethyl-6-methoxy-7-(4-(4'-(4-(trans-4-pentylcyclohexyl)-[1,1'-biphenyl]-4-carbonyloxy)benzoyloxy))-3,13-dihydro-indeno[2',3':3,4]naphtho[1,2-b]pyran;
(PCDC-b5) 3-(4-fluorophenyl)-3-(4-(piperidin-1-yl)phenyl)-13-methoxy-13-ethyl-6-methoxy-7-(4'-(4-(trans-4-pentylcyclohexyl)-[1,1'-biphenyl]-4-carbonyloxy))-3,13-dihydro-indeno[2',3':3,4]naphtho[1,2-b]pyran;
(PCDC-b6) 3,3-bis(4-methoxyphenyl)-13-methoxy-13-ethyl-6-methoxy-7-((trans,trans)-4'-pentyl-[1,1'-bi(cyclohexane)]-4-carbonyloxy)-3,13-dihydro-indeno[2',3':3,4]naphtho[1,2-b]pyran;
(PCDC-b7) 3,3-bis(4-fluorophenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;
(PCDC-b8) 3-(4-methoxyphenyl)-3-(4-(piperidin-1-yl)phenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2,3':3,4]naphtho[1,2-b]pyran;
(PCDC-b9) 3-(4-methoxyphenyl)-3-(4-morpholinophenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;
(PCDC-b10) 3-(4-(4-methoxyphenyl)piperazin-1-yl)-3-phenyl-13-methoxy-13-ethyl-6-methoxy-7-(4'-(4-(2-hydroxyethoxy)benzoyloxy)-[1,1'-biphenyl]-4-carbonyloxy)-[1,1'-biphenyl]-4-carbonyloxy)-3,13-dihydro-indeno[2',3':3,4]naphtho[1,2-b]pyran;
(PCDC-b11) 3,3-bis(4-methoxyphenyl)-13-methoxy-13-ethyl-6-methoxy-7-(3-phenylpropioloyloxy)-3,13-dihydro-indeno[2',3':3,4]naphtho[1,2-b]pyran;

(PCDC-b12) 3,3-bis(4-methoxyphenyl)-13-methoxy-13-ethyl-6-methoxy-7-(2-methyl-4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-b13) 3,3-bis(4-methoxyphenyl)-6,13-dimethoxy-7-(4-(4-(trans,trans-4'-pentyl-[1,1'-bi(cyclohexane)]-4-carbonyloxy)phenyl)piperazin-1 yl)-13-trifluoromethyl-3,13-dihydro-indeno[2',3':3,4]naphtho[1,2-b]pyran;

(PCDC-b14) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1yl)-13-hydroxy-13-trifluoromethyl-3,13-dihydro-indeno[2',3':3,4]naphtho[1,2-b]pyran;

(PCDC-b15) 3,3-bis(4-methoxyphenyl)-6,7-di(4-(4-(trans,trans-4'-pentyl-[1,1'-bi(cyclohexane)]-4-carbonyloxy)phenyl)piperazin-1yl)-13-methoxy-13-trifluoromethyl-3,13-dihydro-indeno[2',3':3,4]naphtho[1,2-b]pyran;

(PCDC-b16) 3,3-bis(4-methoxyphenyl)-6-methoxy-7-(4-(4-((trans,trans)-4'-pentyl-[1,1'-bi(cyclohexane)]-4-carbonyloxy)phenyl)piperazin-1-yl)-13-fluoro-13-trifluoromethyl-3,13-dihydro-indeno[2,3':3,4]naphtho[1,2-b]pyran;

(PCDC-b17) 3-(4-fluorophenyl)-3-(4-(piperidin-1-yl)phenyl)-7-(2-methyl-4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b18) 3-(4-butoxyphenyl)-3-(4-methoxyphenyl)-7-(2-methyl-4-(4'-(trans-4-pentylcyclohexyl)-[1,1'-biphenyl]-4-ylcarboxamido)phenyl)-1'-trifluoromethyl-13,13-dimethyl-3,13-dihydro-indeno[2',3':3,4]naphtho[1,2-b]pyran;

(PCDC-b19) 3-(4-(N-morpholinyl)phenyl)-3-phenyl-7-(4-(4'-(trans-4-pentylcyclohexyl)-[1,1]-biphenyl]-4-ylcarboxamido)phenyl)-10,12-difluoro-13,13-dimethyl-3,13-dihydro-indeno[2',3':3,4]naphtho[1,2-b]pyran;

(PCDC-b20) 3-(4-fluorophenyl)-3-(4-(piperidin-1-yl)phenyl)-7-(4-(4'-(trans-4-pentylcyclohexyl)-[1,1'-biphenyl]-4-ylcarboxamido)phenyl)-10,12-difluoro-13,13-dimethyl-3,13-dihydro-indeno[2',3':3,4]naphtho[1,2-b]pyran;

(PCDC-b21) 3,3-bis(4-methoxyphenyl)-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b22) 3,3-bis(4-methoxyphenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2,3':3,4]naphtho[1,2-b]pyran;

(PCDC-b23) 3,3-bis(4-methoxyphenyl)-6-methoxy-7-(2-methyl-4-(4-(trans-4-pentylcyclohexyl)benzamido)phenyl)phenyl)-10,12-di(trifluoromethyl)-13,13-dimethyl-3,13-dihydro-indeno[2,3':3,4]naphtho[1,2-b]pyran;

(PCDC-b24) 3,3-bis(4-methoxyphenyl)-6-methoxy-7-(2-methyl-4-(4-(trans-4-pentylcyclohexyl)benzamido)benzamido)phenyl)-10,12-di(trifluoromethyl)-13,13-dimethyl-3,13-dihydro-indeno[2',3':3,4]naphtho[1,2-b]pyran;

(PCDC-b25) 3-(4-methoxyphenyl)-3-phenyl-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b26) 3-(4-methoxyphenyl)-3-phenyl-6-methoxy-7-(2-methyl-4-(4-(trans-4-pentylcyclohexyl)benzamido)phenyl)phenyl)-10,12-di(trifluoromethyl)-13,13-dimethyl-3,13-dihydro-indeno[2',3':3,4]naphtho[1,2-b]pyran;

(PCDC-b27) 3-(4-methoxyphenyl)-3-phenyl-6-methoxy-7-(2-methyl-4-(4-((trans,trans)-4'-pentyl-[1,1'-bi(cyclohexane)]-4-carboxamido)benzamido)phenyl)-10,12-di(trifluoromethyl)-13,13-dimethyl-3,13-dihydro-indeno[2',3':3,4]naphtho[1,2-b]pyran;

(PCDC-b28) 3-(4-methoxyphenyl)-3-phenyl-6-methoxy-7-(2-methyl-4-(trans-4-(((4'-(trans-4-pentylcyclohexyl)-[1,1'-biphenyl]-4-yl)oxy)carbonyl)cyclohexanecarboxamido)phenyl)-10,12-di(trifluoromethyl)-13,13-dimethyl-3,13-dihydro-indeno[2',3':3,4]naphtho[1,2-b]pyran;

(PCDC-b29) 3-(4-N-morpholinylphenyl)-3-phenyl-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b30) 3-(4-N-morpholinophenyl)-3-phenyl-6-methoxy-7-(2-methyl-4-(trans-4-(((4'-(trans-4-pentylcyclohexyl)-[1,1'-biphenyl]-4-yl)oxy)carbonyl)cyclohexanecarboxamido)phenyl)-10,12-di(trifluoromethyl)-13,13-dimethyl-3,13-dihydro-indeno[2,3':3,4]naphtho[1,2-b]pyran;

(PCDC-b31) 3-(4-N-morpholinophenyl)-3-phenyl-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b32) 3-(4-N-morpholinophenyl)-3-(4-methoxyphenyl)-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b33) 3-(4-N-morpholinophenyl)-3-(4-methoxyphenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b34) 3-phenyl-3-(4-(piperidin-1-yl)phenyl)-6-methoxy-7-(4-(4-(trans-4-pentylcyclohexyl)benzamido)-2-(trifluoromethyl)phenyl)-10,12-di(trifluoromethyl)-13,13-dimethyl-3,13-dihydro-indeno[2',3':3,4]naphtho[1,2-b]pyran;

(PCDC-b35) 3,3-bis(4-fluorophenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b36) 3,3-bis(4-fluorophenyl)-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b37) 3-(4-(piperidin-1-yl)phenyl)-3-phenyl-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b38) 3-(4-(N-morpholino)phenyl)-3-phenyl-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b39) 3-(4-(N-morpholino)phenyl)-3-phenyl-6-methoxy-7-(4-(4-((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2,3':3,4]naphtho[1,2-b]pyran;

(PCDC-b40) 3,3-bis(4-methoxyphenyl)-6-methoxy-7-(4-(4-((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b41) 3-(4-fluorophenyl)-3-(4-(piperidin-1-yl)phenyl)-6-methoxy-7-(4-(4-((trans,trans)-4'-pentyl-[1,1']-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b42) 3-(4-fluorophenyl)-3-(4-(piperidin-1-yl)phenyl)-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2,3':3,4]naphtho[1,2-b]pyran;

(PCDC-b43) 3,3-bis(4-methoxyphenyl)-6,13-dimethoxy-7-(trans-4-(4'-(trans-4-pentylcyclohexyl)-[1,1'-biphenyl]-4-yloxycarbonyl)cyclohexanecarbonyloxy)-13-ethyl-3,13-dihydro-indeno[2,3':3,4]naphtho[1,2-b]pyran;

(PCDC-b44) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b45) 3,3-bis(4-hydroxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b46) 3,3-bis(4-fluorophenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b47) 3-(4-methoxyphenyl)-3-(4-N-morpholinophenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b48) 3,3-bis(4-methoxyphenyl)-6-methoxy-7-(4-(4-(trans-4-(4'-(trans-4-pentylcyclohexyl)-[1,1'-biphenyl]-4-yloxycarbonyl)cyclohexanecarbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b49) 3,3-bis(4-methoxyphenyl)-6-methoxy-7-(4-(4-(trans-4-(4'-(trans-4-pentylcyclohexyl)-phenyloxycarbonyl)-cyclohexanecarbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b50) 3,3-bis(4-methoxyphenyl)-7-(4-(4-(trans-4-pentylcyclohexyl)phenoxycarbonyl)phenyl)-11-methyl-13,13-dimethyl-3,13-dihydro-indeno[2',3':3,4]naphtho[1,2-b]pyran;

(PCDC-b51) 3-(4-fluorophenyl)-3-(4-(piperidin-1-yl)phenyl)-6-methyl-7-(4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b52) 3,3-bis(4-hydroxyphenyl)-6-methyl-7-(4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b53) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-11-trifluoromethyl-13,13-dimethyl-3,13-dihydro-indeno[2,3':3,4]naphtho[1,2-b]pyran;

(PCDC-b54) 3-(4-(4-methoxyphenyl)piperazin-1-yl)-3-phenyl-6-methoxy-7-(4-((4-(trans-4-propylcyclohexyl)phenoxy)carbonyl)phenyloxycarbonyl)-13,13-dimethyl-3,13-dihydro-indeno[2,3':3,4]naphtho[1,2-b]pyran; and (PCDC-b55) 3,3-bis(4-methoxyphenyl)-7-(4-([1,1':4',1"-terphenyl]-4-ylcarbamoyl)piperazin-1-yl)-6,13-dimethoxy-13-trifluoromethyl-3,13-dihydro-indeno[2',3':3,4]naphtho[1,2-b]pyran.

More generally, the photochromic-dichroic compounds of the photochromic-dichroic articles of the present invention include: (a) at least one photochromic group (PC), which can be chosen from, for example, pyrans, oxazines, and fulgides; and (b) at least one lengthening agent or group attached to the photochromic group. Such photochromic-dichroic compounds are described in detail in U.S. Pat. No. 7,342,112 B1 at column 5, line 35 to column 14, line 54; and Table 1, the cited portions of which are incorporated by reference herein. Other suitable photochromic compounds and reaction schemes for their preparation can be found in U.S. Pat. No. 7,342,112 B1 at column 23, line 37 to column 78, line 13, the cited portions of which are incorporated by reference herein.

Non-limiting examples of thermally reversible photochromic pyrans from which the photochromic (PC) group, of the photochromic-dichroic compound, can be chosen include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767, and heterocyclic-fused naphthopyrans, such as those disclosed in U.S. Pat. Nos. 5,723,072, 5,698,141, 6,153,126, and 6,022,497, which are hereby incorporated by reference; spirofluoreno[1,2-b]pyrans, such as spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. More specific examples of naphthopyrans and the complementary organic photochromic substances are described in U.S. Pat. No. 5,658,501, which are hereby specifically incorporated by reference herein. Spiro(indoline)pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Non-limiting examples of photochromic oxazines from which the PC group can be chosen include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, and spiro(indoline)quinoxazine. Non-limiting examples of photochromic fulgides from which PC can be chosen include: fulgimides, and the 3-furyl and 3-thienyl fulgides and fulgimides, which are disclosed in U.S. Pat. No. 4,931,220 (which are hereby specifically incorporated by reference) and mixtures of any of the aforementioned photochromic materials/compounds.

In accordance with some embodiments, the photochromic-dichroic compound can include at least two photochromic compounds (PCs), in which case the PCs can be linked to one another via linking group substituents on the individual PCs. For example, the PCs can be polymerizable photochromic groups or photochromic groups that are adapted to be compatible with a host material ("compatibilized photochromic group"). Non-limiting examples of polymerizable photochromic groups from which PC can be chosen and that are useful in conjunction with various non-limiting embodiments disclosed herein are disclosed in U.S. Pat. No. 6,113,814, which is hereby specifically incorporated by reference herein. Non-limiting examples of compatiblized photochromic groups from which PC can be chosen and that are useful in conjunction with various non-limiting embodiments disclosed herein are disclosed in U.S. Pat. No. 6,555,028, which is hereby specifically incorporated by reference herein.

Other suitable photochromic groups and complementary photochromic groups are described in U.S. Pat. No. 6,080,338 at column 2, line 21 to column 14, line 43; U.S. Pat. No. 6,136,968 at column 2, line 43 to column 20, line 67; U.S. Pat. No. 6,296,785 at column 2, line 47 to column 31, line 5; U.S. Pat. No. 6,348,604 at column 3, line 26 to column 17, line 15; U.S. Pat. No. 6,353,102 at column 1, line 62 to column 11, line 64; and U.S. Pat. No. 6,630,597 at column 2, line 16 to column 16, line 23; the disclosures of the aforementioned patents are incorporated herein by reference.

With some embodiments of the present invention, the photochromic-dichroic compound includes at least one photochromic moiety (at least one PC moiety or group), and each photochromic moiety is independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

The photochromic-dichroic compounds can be present in the photochromic-dichroic layer in amounts (or ratios) such that the photochromic-dichroic article exhibits desired optical properties, such as a desired level of photochromic activity and a desired level of dichroic activity. The particular amount of the photochromic-dichroic compound that is present in the photochromic-dichroic layer is not critical, with some embodiments, provided that at least a sufficient amount is present so as to produce the desired effect. For purposes of non-limiting illustration, the amount of photochromic-dichroic compound that is present in the photochromic-dichroic layer can depend on a variety of factors, such as but not limited to, the absorption characteristics of the photochromic-dichroic compound, the color and intensity photochromic-dichroic compound upon photochromic activation, the level of dichroic activity of the photochromic-dichroic compound upon dichroic activation, and the method used to incorporate the photochromic-dichroic compound into the photochromic-dichroic layer.

The photochromic-dichroic layer of the photochromic-dichroic articles of the present invention can, with some embodiments, include one or more photochromic-dichroic compounds, in an amount of from 0.01 to 40 weight percent, or from 0.05 to 15, or from 0.1 to 5 weight percent, based on the weight of the photochromic-dichroic layer.

The photochromic-dichroic compounds of the photochromic-dichroic articles of the present invention can be prepared in accordance with art-recognized methods. With some embodiments, the photochromic-dichroic compounds can be prepared in accordance with the description provided at column 35, line 28 through column 66, line 60 of U.S. Pat. No. 7,256,921, which disclosure is incorporated herein by reference.

The photochromic-dichroic layer, with some embodiments, can include a single layer or multiple layers each including a photochromic-dichroic compound that can be the same or different. The photochromic-dichroic layer can be formed by art-recognized methods including, but not limited to: lamination, such as of one or more plastic sheets or films; in-mold formation, such as in-mold coating; film casting; and coating methods. With some embodiments the photochromic-dichroic layer is formed from a photochromic-dichroic coating composition. The photochromic-dichroic coating composition can be a curable photochromic-dichroic coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The photochromic-dichroic layer typically includes an organic matrix, such as a thermoplastic organic matrix and/or a crosslinked organic matrix. At least a portion of the organic matrix of the photochromic-dichroic layer can in some embodiments include anisotropic materials, such as liquid crystal materials, additives, oligomers, and/or polymers, as will be discussed in further detail herein. Additionally or alternatively to an organic matrix, the photochromic-dichroic layer can include an inorganic matrix, including, for example, silane linkages, siloxane linkages and/or titanate linkages. The organic matrix of the photochromic-dichroic layer can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The photochromic-dichroic layer can have any suitable thickness. With some embodiments, the photochromic-dichroic layer has a thickness of from 0.5 to 50 microns, such as from 1 to 45 microns, or from 2 to 40 microns, or from 5 to 30 microns, or from 10 to 25 microns.

With some embodiments, the photochromic-dichroic layer, of the photochromic-dichroic article, further includes a phase-separated polymer that includes: a matrix phase that is at least partially ordered; and a guest phase that is at least partially ordered. The guest phase of the photochromic-dichroic layer includes the photochromic-dichroic compound, and the photochromic-dichroic compound is at least partially aligned with at least a portion of the guest phase of the photochromic-dichroic layer.

In accordance with further embodiments of the present invention, the photochromic-dichroic layer further includes an interpenetrating polymer network that includes: an anisotropic material that is at least partially ordered, and a polymeric material. The anisotropic material of the photochromic-dichroic layer includes the photochromic-dichroic compound, and the photochromic-dichroic compound is at least partially aligned with at least a portion of the anisotropic material of the photochromic-dichroic layer.

With some embodiments of the present invention, the photochromic-dichroic layer further includes an anisotropic material. As used herein the term "anisotropic" means having at least one property that differs in value when measured in at least one different direction. Accordingly, "anisotropic materials" are materials that have at least one property that differs in value when measured in at least one different direction. Non-limiting examples of anisotropic materials that can be included in the photochromic-dichroic layer include, but are not limited to, those liquid crystal materials as described further herein with regard to the optional first and second alignment layers of the photochromic-dichroic articles of the present invention.

With some embodiments, the anisotropic material of the photochromic-dichroic layer includes a liquid crystal material. Classes of liquid crystal materials include, but are not limited to, liquid crystal oligomers, liquid crystal polymers, mesogenic compounds, and combinations thereof.

With some embodiments, the photochromic-dichroic layer includes: (i) liquid crystal oligomers and/or polymers prepared at least in part from the monomeric mesogenic compounds; and/or (ii) the mesogenic compounds, in each case as disclosed in Table 1 of U.S. Pat. No. 7,910,019 B2 at columns 43-90 thereof, which disclosure is incorporated herein by reference.

In accordance with some embodiments of the present invention, the photochromic-dichroic compound, of the photochromic-dichroic layer, is at least partially aligned by interaction with the anisotropic material of (or present within) that layer, which itself is at least partially ordered. For purposes of non-limiting illustration, at least a portion of the photochromic-dichroic compound can be aligned such that the long-axis of the photochromic-dichroic compound in the dichroic state is essentially parallel to the general direction of the anisotropic material of the photochromic-dichroic layer. Further, although not required, the photochromic-dichroic compound can be bound to or reacted with at least a portion of the at least partially ordered anisotropic material of the photochromic-dichroic layer.

Methods of ordering, or introducing order into, the anisotropic material of the photochromic-dichroic layer include, but are not limited to, exposing the anisotropic material to at least one of a magnetic field, an electric field, linearly polarized ultraviolet radiation, linearly polarized infrared radiation, linearly polarized visible radiation, and a shear force. Alternatively or additionally, the anisotropic material can be at least partially ordered by aligning at least a portion of the anisotropic material with another material or structure. For example, the anisotropic material can be at least partially ordered by aligning the anisotropic material with an alignment layer (or an orientation facility) such as, but not limited to, the alignment layer as described in further detail herein below.

By ordering at least a portion of the anisotropic material, it is possible to at least partially align at least a portion of the photochromic-dichroic compound that is contained within or otherwise connected to the anisotropic material of the photochromic-dichroic layer. Although not required, the photochromic-dichroic compound can be at least partially aligned while in an activated state. With some embodiments, ordering of the anisotropic material and/or aligning the photochromic-dichroic compound can each independently occur prior to, during, or after application or formation of the respective photochromic-dichroic layer.

The photochromic-dichroic compound and the related anisotropic material can each independently be aligned and ordered during application or formation of the photochromic-dichroic layer. For purposes of non-limiting illustration, the photochromic-dichroic layer can be applied using a coating technique that introduces a shear force to the anisotropic material during application, such that the anisotropic material becomes at least partially ordered generally parallel to the direction of the applied shear force. For purposes of further non-limiting illustration, a solution or mixture (optionally in a solvent or carrier) including, for example, the photochromic-dichroic compound and the anisotropic material can be coated over the substrate (or one or more previously applied layers), such that shear forces are introduced to the materials being applied due to relative movement of the surface of the substrate with respect to the materials being applied. An example of a coating process that can introduce at least sufficient shear forces is a curtain coating process. The shear forces can cause at least a portion of the anisotropic material to be ordered in a general direction that is substantially parallel to the direction of the movement of the surface. As discussed above, by ordering at least a portion of the anisotropic material in this manner, at least a portion of the photochromic-dichroic compound can be aligned. In addition, and optionally, by exposing at least a portion of the photochromic-dichroic compound to actinic radiation during the curtain coating process, so as to convert the photochromic-dichroic compound to an activated state, at least partial alignment of the photochromic-dichroic compound while in the activated state can also be achieved.

The photochromic-dichroic compound and the anisotropic material can be aligned and ordered after application or formation of the photochromic-dichroic layer. For purposes of non-limiting illustration, a solution or mixture of the photochromic-dichroic compound and the anisotropic material (optionally in a solvent or carrier) can be spin-coated over at least a portion of the substrate (or one or more previously applied layers). Thereafter, at least a portion of the anisotropic material can be ordered, for example, by exposing the anisotropic material to a magnetic field, an electric field, linearly polarized ultraviolet radiation, linearly polarized infrared radiation, linearly polarized visible radiation, and/or a shear force. Alternatively or additionally, the anisotropic material can be at least partially ordered by alignment thereof with another material or structure, such as an alignment layer.

The photochromic-dichroic compound and the related anisotropic material can each independently be aligned and ordered prior to application of the photochromic-dichroic layer. For purposes of non-limiting illustration, a solution or mixture (optionally in a solvent or carrier) of the photochromic-dichroic compound and the anisotropic material can be applied over an ordered polymeric sheet to form a layer thereover. Thereafter, at least a portion of the anisotropic material can be allowed to align with the underlying ordered polymeric sheet. The polymeric sheet can be subsequently applied over the substrate of the photochromic-dichroic article by, for example, art-recognized laminating or bonding methods. Alternatively, the ordered photochromic-dichroic layer can be transferred from the polymeric sheet to/over an underlying structure (such as, the substrate or one or more previously applied/formed layers) by art-recognized method, such as hot stamping.

With some embodiments, the photochromic-dichroic layer can include a phase-separated polymer that includes: a matrix phase; and a guest phase distributed in the matrix phase. The matrix phase can independently include an at least partially ordered liquid crystal polymer. The guest phase can independently include the at least partially ordered anisotropic material and at least a portion of photochromic-dichroic compound, which can be at least partially aligned. The at least partially aligned photochromic-dichroic compound can be at least partially aligned by interaction with the at least partially ordered anisotropic material.

For purposes of non-limiting illustration, with some embodiments, a phase-separating polymer system including, a matrix phase forming material that includes a liquid crystal material, and a guest phase forming material that includes the anisotropic material and the photochromic-dichroic compound, is applied over the substrate (or one or more previously applied layers). After applying the phase-separating polymer system, at least portion of the liquid crystal material of the matrix phase and at least a portion of the anisotropic material of the guest phase are at least partially ordered, such that at least a portion of the photochromic-dichroic compound is aligned with at least a portion of the at least partially ordered anisotropic material of the guest phase. Methods of ordering the matrix phase forming material and the guest phase forming material of the phase-separating polymer system include, but are not limited to, exposing the applied layer to at least one of: a magnetic field, an electric field, linearly polarized infrared radiation, linearly polarized ultraviolet radiation, linearly polarized visible radiation, and a shear force. Alternatively or additionally, ordering the matrix phase forming material and the guest phase forming material can include alignment thereof by interaction with an underlying alignment layer, as described in further detail herein.

After ordering the matrix phase forming material and the guest phase forming material, the guest phase forming material can be separated from the matrix phase forming material by polymerization induced phase separation and/or solvent induced phase separation. Although the separation of the matrix and guest phase forming materials is described herein in relation to the guest phase forming material separating from the matrix phase forming material, it should be appreciated that this language is intended to cover any separation between the two phase forming materials. That is, this language is intended to cover separation of the guest phase forming material from the matrix phase forming material, and separation of the matrix phase forming material from the guest phase forming material, as well as, simultaneous separation of both phase forming materials, and any combination thereof.

According to some embodiments, the matrix phase forming material can include a liquid crystal material chosen form liquid crystal monomers, liquid crystal pre-polymers, and liquid crystal polymers. The guest phase forming material can, with some embodiments, include a liquid crystal material chosen from liquid crystal mesogens, liquid crystal monomers, and liquid crystal polymers and pre-polymers. Examples of such materials include, but are not limited to, those described above, and further herein with regard to the optional alignment layer.

With some embodiments, the phase-separating polymer system can include, a mixture of a matrix phase forming material that includes a liquid crystal monomer, a guest phase forming material that includes liquid crystal mesogens and the photochromic-dichroic compound. With such non-limiting embodiments, causing the guest phase forming material to separate from the matrix phase forming material can include polymerization induced phase-separation. Typically, the liquid crystal monomer of the matrix phase can be polymerized and thereby separated from at least a portion of the liquid crystal mesogens of the guest phase forming material. Examples of polymerization methods include, but are not limited to, photo-induced polymerization and thermally-induced polymerization.

With some further embodiments, the phase-separating polymer system can include, a mixture of a matrix phase forming material that includes a liquid crystal monomer, a guest phase forming material that includes a low viscosity liquid crystal monomer having a different functionality from the liquid crystal monomer of the matrix phase, and the photochromic-dichroic compound. As used herein, the term "low viscosity liquid crystal monomer," refers to a liquid crystal monomer mixture or solution that is freely flowing at room temperature. Typically, causing the guest phase forming material to separate from the matrix phase forming material includes polymerization induced phase-separation. For example, at least a portion of the liquid crystal monomer of the matrix phase can be polymerized under conditions that do not cause the liquid crystal monomer of the guest phase to polymerize. During polymerization of the matrix phase forming material, the guest phase forming material typically separates from the matrix phase forming material. Thereafter, the liquid crystal monomer of the guest phase forming material can be polymerized in a separate polymerization process.

The phase-separating polymer system can include, with some embodiments, a solution in at least one common solvent of a matrix phase forming material that includes a liquid crystal polymer, a guest phase forming material that includes a liquid crystal polymer that is different from the liquid crystal polymer of the matrix phase forming material, and the photochromic-dichroic compound. Causing the guest phase forming material to separate from the matrix phase forming material typically includes solvent induced phase-separation. Typically, at least a portion of the common solvent is evaporated from the mixture of liquid crystal polymers, thereby causing the two phases to separate from each other.

With further embodiments, the photochromic-dichroic layer can include an interpenetrating polymer network. The at least partially ordered anisotropic material and a polymeric material can form an interpenetrating polymer network, in which at least a portion of the polymeric material interpenetrates with at least a portion of the at least partially ordered anisotropic material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. In addition, at least a portion of the at least partially aligned photochromic-dichroic compound can be at least partially aligned with the at least partially ordered anisotropic material. Still further, the polymeric material can be isotropic or anisotropic, provided that, on the whole, the photochromic-dichroic layer is anisotropic. Methods of forming such a photochromic-dichroic layer are described in more detail herein below.

According to some embodiments, the anisotropic material can be adapted to allow the photochromic-dichroic compound to switch from a first state to a second state at a desired rate. In general, conventional photochromic compounds can undergo a transformation from one isomeric form to another in response to actinic radiation, with each isomeric form having a characteristic absorption spectrum. The photochromic-dichroic compound of the photochromic-dichroic articles of the present invention can undergo a similar isomeric transformation. Without intending to be bound by any theory, the rate or speed at which this isomeric transformation (and the reverse transformation) occurs depends, in part, upon the properties of the local environment surrounding the photochromic-dichroic compound (which can be referred to as the "host"). Although not limiting herein, it is believed based on the evidence at hand that the rate of transformation of the photochromic-dichroic compound depends, in part, upon the flexibility of the chain segments of the host, and more particularly on the mobility or viscosity of the chain segments of the host. Correspondingly it is believed, without intending to be bound by any theory, that the rate of transformation of the photochromic-dichroic compound is generally faster in hosts having flexible chain segments, than in hosts having stiff or rigid chain segments. As such, and in accordance with some embodiments, when the anisotropic material is a host, the anisotropic material can be adapted to allow the photochromic-dichroic compound to transform between various isomeric states at a desired rate. For example, the anisotropic material can be adapted by adjusting the molecular weight and/or the crosslink density of the anisotropic material.

With some embodiments, the photochromic-dichroic layer includes a phase-separated polymer that includes a matrix phase including a liquid crystal polymer, and guest phase distributed within the matrix phase. The guest phase can include the anisotropic material. Typically, with some embodiments, a majority of the photochromic-dichroic compound can be contained within the guest phase of the phase-separated polymer. As previously discussed, because the transformation rate of a photochromic-dichroic compound depends, in part, on the host in which it is contained or resides, the rate of transformation of the photochromic-dichroic compound depends, substantially, on the properties of the guest phase, with some embodiments.

With some embodiments, and as discussed in further detail herein, the photochromic-dichroic articles of the present invention can include an alignment layer (also referred to as an alignment or orientation facility). With some further embodiments, the photochromic-dichroic article can include, an alignment layer interposed between the first surface of the substrate and the photochromic-dichroic layer, in which the alignment layer and the photochromic-dichroic layer at least partially abut each other. The alignment layer can also be referred to herein as an orientation facility. The photochromic-dichroic compound of the photochromic-dichroic layer can be at least partially aligned by interaction with the underlying alignment layer.

With some embodiments, the fixed-polarized layer is interposed between the first surface of the substrate and the photochromic-dichroic layer, in which case the optional alignment layer is interposed between the fixed-polarized layer and the photochromic-dichroic layer, and the alignment layer and the photochromic-dichroic layer at least partially abut each other. With some further embodiments, the photochromic-dichroic layer is interposed between the first surface of the substrate and the fixed-polarized layer, in which case the optionally alignment layer is interposed between the first surface of the substrate and the photochromic-dichroic layer, and the alignment layer and the photochromic-dichroic layer at least partially abut each other.

Figure 6:
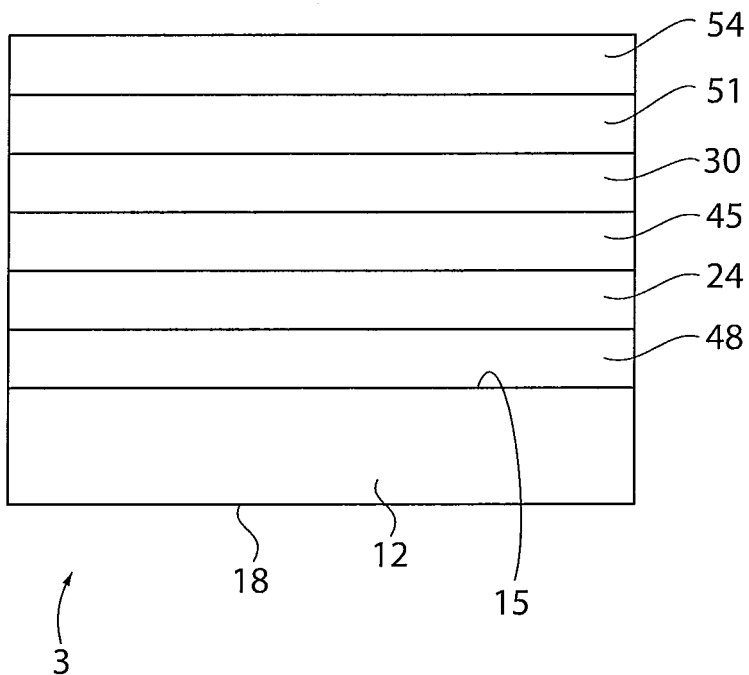
FIG. 6 is a representative side elevation sectional view of a photochromic-dichroic article according to the present invention that further includes alignment, primer, topcoat and hard coat layers.

With reference to FIG. 6, photochromic-dichroic article 3 includes an alignment layer 45 that is interposed between substrate 11 and the photochromic-dichroic layer 30. With the non-limiting embodiment of the present invention represented by FIG. 6, fixed-polarized layer 24 is interposed between first surface 15 of substrate 12 and photochromic-dichroic layer 30, and correspondingly, alignment layer 45 is interposed between fixed-polarized layer 24 and photochromic-dichroic layer 30. In addition, alignment layer 45 is in abutting relationship with at least a portion of the overlying photochromic-dichroic layer 30, and correspondingly, photochromic-dichroic layer 30 is in abutting relationship with at least a portion of underlying alignment layer 45. As depicted in FIG. 6, alignment layer 45 and fixed-polarized layer 24 are in at least partial abutting relationship. With some embodiments, one or more additional layers can be interposed between fixed-polarized layer 24 and alignment layer 45.

Photochromic-dichroic article 3 also includes a primer layer 48 that, with the non-limiting embodiment depicted in FIG. 6, is interposed between first surface 15 of substrate 12 and fixed-polarized layer 24. Photochromic-dichroic article 3 of FIG. 6 also includes a topcoat layer 51 that resides over photochromic-dichroic layer 30. With some embodiments, one or more further layers (not shown) can be interposed between topcoat layer 51 and photochromic-dichroic layer 30.

As used herein the term "alignment layer" means a layer that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term order also encompasses combinations of contact and non-contact methods.

For example, a photochromic-dichroic compound that is at least partially aligned by interaction with an alignment layer can be at least partially aligned such that the long-axis of the photochromic-dichroic compound in the activated state is essentially parallel to at least the first general direction of the alignment layer. With some embodiments, a photochromic-dichroic compound that is at least partially aligned by interaction with an alignment layer is bound to or reacted with the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

The alignment layer can, with some embodiments, have at least a first general direction. For example, the alignment layer can include a first ordered region having a first general direction and at least one second ordered region adjacent the first ordered region having a second general direction that is different from the first general direction. Further, the alignment layer can have a plurality of regions, each of which has a general direction that is the same or different from the remaining regions so as to form a desired pattern or design. The alignment layer can include, for example, a coating including an at least partially ordered alignment medium, an at least partially ordered polymer sheet, an at least partially treated surface, Langmuir-Blodgett films, and combinations thereof.

An alignment layer can include, with some embodiments, a coating that includes an at least partially ordered alignment medium. Examples of suitable alignment media that can be used in conjunction with the first and second alignment layers include, but are not limited to, photo-orientation materials, rubbed-orientation materials, and liquid crystal materials. Methods of ordering at least a portion of the alignment medium are described herein below in further detail.

The alignment medium of the alignment layer can be a liquid crystal material, and the alignment layer can be referred to as a liquid crystal alignment layer. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For purposes of non-limiting illustration, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. For purposes of non-limiting illustration, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media include, but are not limited to, liquid crystal polymers, liquid crystal pre-polymers, liquid crystal monomers, and liquid crystal mesogens. As used herein the term "pre-polymer" means partially polymerized materials.

Classes of liquid crystal monomers that are suitable for use in conjunction with the alignment layer include, but are not limited to, mono- as well as multi-functional liquid crystal monomers. The liquid crystal monomers can, with some embodiments, be selected from cross-linkable liquid crystal monomers, such as photocross-linkable liquid crystal monomers. As used herein the term "photocross-linkable" means a material, such as a monomer, a pre-polymer or a polymer, that can be cross-linked on exposure to actinic radiation. For example, photocross-linkable liquid crystal monomers include, but are not limited to, those liquid crystal monomers that are cross-linkable on exposure to ultraviolet radiation and/or visible radiation, either with or without the use of polymerization initiators.

Examples of cross-linkable liquid crystal monomers, that can be included in the alignment layer, include, but are not limited to, liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Examples of photocross-linkable liquid crystal monomers, that can be included in the alignment layer, include, but are not limited to, liquid crystal monomers having functional groups chosen from acrylates, methacrylates, alkynes, epoxides, thiols, and blends thereof.

Liquid crystal polymers and pre-polymers, that can be included in the alignment layer, include, but are not limited to, main-chain liquid crystal polymers and pre-polymers and side-chain liquid crystal polymers and pre-polymers. With main-chain liquid crystal polymers and pre-polymers, rod- or disc-like liquid crystal mesogens are primarily located within the polymer backbone. With side-chain liquid crystal polymers and pre-polymers, the rod- or disc-like liquid crystal mesogens primarily are located within the side chains of the polymer. Additionally, the liquid crystal polymer or pre-polymer can be cross-linkable, and further can be photocross-linkable.

Examples of liquid crystal polymers and pre-polymers, that can be included in the alignment layer, include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers, that can be included in the alignment layer, include, but are not limited to, those polymers and pre-polymers having functional groups chosen from acrylates, methacrylates, alkynes, epoxides, thiols, and blends thereof.

Liquid crystal mesogens, that can be included in the alignment layer, include, but are not limited to, thermotropic liquid crystal mesogens and lyotropic liquid crystal mesogens. Additional classes of liquid crystal mesogens, that can be included in the alignment layer, include, but are not limited to, columatic (or rod-like) liquid crystal mesogens and discotic (or disc-like) liquid crystal mesogens.

Examples of photo-orientation materials, that can be included in the alignment layer, include, but are not limited to, photo-orientable polymer networks. More specific examples of photo-orientable polymer networks include, but are not limited to, azobenzene derivatives, cinnamic acid derivatives, coumarine derivatives, ferulic acid derivatives, and polyimides. With some embodiments, the alignment layer can include an at least partially ordered photo-orientable polymer network chosen from azobenzene derivatives, cinnamic acid derivatives, coumarine derivatives, ferulic acid derivatives, and/or polyimides. Examples of cinnamic acid derivatives, that can be included in the alignment layer, include, but are not limited to, polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, the rubbed-orientation material can be rubbed with a suitably textured cloth or a velvet brush. Examples of rubbed-orientation materials, that can be included in the alignment layer, include, but are not limited to, (poly)imides, (poly)siloxanes, (poly)acrylates, and (poly)coumarines. With some embodiments, the alignment layer can include a polyimide, and the alignment layer can be rubbed with a velvet or a cotton cloth so as to at least partially order at least a portion of the surface of the rubbed alignment layer.

With some embodiments, the alignment layer can include an at least partially ordered polymer sheet. For example, a sheet of polyvinyl alcohol can be at least partially ordered by stretching (e.g., uniaxially stretching) the sheet, and thereafter the stretched sheet can be bonded to or over at least a portion a surface of the substrate to form the orientation facility. Alternatively, the ordered polymer sheet can be made by a method that at least partially orders the polymer chains during fabrication, for example, by extrusion. Further, the at least partially ordered polymer sheet can be formed by casting or otherwise forming a sheet of a liquid crystal material and thereafter at least partially ordering the sheet for example, but exposing the sheet to a magnetic field, an electric field, and/or a shear force. Still further, the at least partially ordered polymer sheet can be made using photo-orientation methods. For example, a sheet of a photo-orientation material can be formed, for example by casting, and thereafter at least partially ordered by exposure to linearly polarized ultraviolet radiation.

The alignment layer of the photochromic-dichroic articles of the present invention can include an at least partially treated surface. As used herein, the term "treated surface" refers to at least a portion of a surface that has been physically altered to create at least one ordered region on least a portion of the surface. Examples of treated surfaces include, but are not limited to, rubbed surfaces, etched surfaces, and embossed surfaces. Further, the treated surfaces can be patterned, for example using a photolithographic or an interferographic process. With some embodiments, the surface of the alignment layer can be a treated surface selected from, for example, chemically etched surfaces, plasma etched surfaces, nanoetched surfaces (such as surfaces etched using a scanning tunneling microscope or an atomic force microscope), laser etched surfaces, and/or electron-beam etched surfaces.

In accordance with some embodiments, when the alignment layer includes a treated surface, the treated surface can be formed by depositing a metal salt (such as a metal oxide or metal fluoride) onto at least a portion of a surface (e.g., a surface of the alignment layer itself, or a surface of the primer layer), and thereafter etching the deposit to form the treated surface. Art-recognized methods of depositing a metal salt include, but are not limited to, plasma vapor deposition, chemical vapor deposition, and sputtering. Etching can be undertaken in accordance with art-recognized methods, such as those described previously herein.

As used herein the term "Langmuir-Blodgett films" means one or more at least partially ordered molecular films on a surface. Langmuir-Blodgett films can be formed, for example, by dipping a substrate into a liquid one or more times so that it is at least partially covered by a molecular film and then removing the substrate from the liquid such that, due to the relative surface tensions of the liquid and the substrate, the molecules of the molecular film are at least partially ordered in substantially one (or a single) general direction. As used herein, the term molecular film refers to monomolecular films (which can be referred to herein as monolayers) as well as films comprising more than one monolayer.

With some embodiments, the phase-separated polymer of the photochromic-dichroic layer, can include a matrix phase, at least a portion of which is at least partially aligned with the underlying alignment layer, and a guest phase including an anisotropic material, in which the guest phase is dispersed within the matrix phase. At least a portion of the anisotropic material of the guest phase can be at least partially aligned with at least portion of the underlying alignment layer, and the photochromic-dichroic compound can be at least partially aligned with at least a portion of the anisotropic material. In addition, the matrix phase of the phase-separated polymer can include a liquid crystal polymer, and the anisotropic material of the guest phase can be chosen from liquid crystal polymers and liquid crystal mesogens. Non-limiting examples of such materials are set forth in detail above. When including a phase-separated polymer as described, the photochromic-dichroic layer can be substantially haze-free. Haze is defined as the percentage of transmitted light that deviates from the incident beam by more than 2.5 degrees on average according to ASTM D 1003 Standard Test Method of Haze and Luminous Transmittance of Transparent Plastics. An example of an instrument on which haze measurements according to ASTM D 1003 can be made is Haze-Gard Plus™ made by BYK-Gardener.

The photochromic-dichroic articles of the present invention can, with some embodiments, further include an alignment transfer material interposed between the alignment layer and the photochromic-dichroic layer. The alignment transfer material can be aligned by interaction with the alignment layer, and correspondingly the photochromic-dichroic compound can be aligned by interaction with the alignment transfer material. The alignment transfer material can, with some embodiments, facilitate the propagation or transfer of a suitable arrangement or position from the alignment layer to the photochromic-dichroic compound of the overlying photochromic-dichroic layer.

Examples of alignment transfer materials include, but are not limited to, those liquid crystal materials described above in connection with the alignment media disclosed herein. It is possible to align the molecules of a liquid crystal material with an oriented surface. For example, a liquid crystal material can be applied to a surface that has been oriented and subsequently aligned such that the long axis of the liquid crystal molecules adopts an orientation that is generally parallel to the same general direction of orientation of the surface. The liquid crystal material of the alignment transfer material can be at least partially ordered by alignment with the alignment layer, such that the long axis of the molecules of the liquid crystal material are generally parallel to, for example, a first general direction of the orientation facility. In this manner, the general direction of the alignment layer can be transferred to the liquid crystal material, which in turn can transfer the general direction to another structure or material. Further, if the alignment layer includes a plurality of regions having general directions that together form a design or pattern, that design or pattern can be transferred to the liquid crystal material by aligning the liquid crystal material with the various regions of the alignment layer. Additionally, although not required, according to various non-limiting embodiments disclosed herein, at least a portion of the liquid crystal material of the alignment transfer material can be exposed to at least one of, a magnetic field, an electric field, linearly polarized infrared radiation, linearly polarized ultraviolet radiation, and linearly polarized visible radiation while being at least partially aligned with at least a portion of the alignment layer.

In accordance with some embodiments, the photochromic-dichroic compound can be encapsulated or overcoated with an anisotropic material having relatively flexible chain segments, such as a liquid crystal material, and thereafter dispersed or distributed in another material having relatively rigid chain segments. The encapsulating anisotropic material can be at least partially ordered. For example, the encapsulated photochromic-dichroic compound can be dispersed or distributed in a liquid crystal polymer having relatively rigid chain segments and thereafter the mixture can be applied so as to form the particular photochromic-dichroic layer.

With further embodiments, the photochromic-dichroic layer is defined by a polymeric sheet, the polymeric sheet includes the photochromic-dichroic compound, the polymeric sheet is laterally aligned along a second lateral direction, and the photochromic-dichroic compound is substantially laterally aligned along the second lateral direction. The polymeric sheet can be uniaxially stretched, with some embodiments. Stretching, such as uniaxial stretching, of the polymeric sheet typically results in alignment and ordering of the photochromic-dichroic material therein. The photochromic-dichroic layer can, with some embodiments, include two or more polymeric sheets each independently containing a photochromic-dichroic compound which can the same or different, in which each polymeric sheet can be stretched in the same direction.

Examples of polymeric sheets that can be used as or to form the first and second photochromic-dichroic layers include, but are not limited to: stretched (such as uniaxially stretched) polymer sheets; ordered liquid crystal polymer sheets; and photo-oriented polymer sheets. Examples of polymeric materials, other than liquid crystal materials and photo-orientation materials that can be used in forming polymeric sheets of the first and/or second photochromic-dichroic layers include, but are not limited to: polyvinyl alcohol, polyvinyl chloride, polyurethane, polyacrylate, and polycaprolactam. Non-limiting examples of methods of at least partially ordering polymeric sheets are described below in more detail.

In accordance with some embodiments, the photochromic-dichroic layer of the photochromic-dichroic articles of the present invention, can be formed by applying at least one anisotropic material, imbibing the photochromic-dichroic compound into the previously applied anisotropic material, ordering the anisotropic material, and aligning the photochromic-dichroic compound with at least a portion of the ordered anisotropic material. The anisotropic material can be ordered before, during or after imbibition with the photochromic-dichroic compound. The photochromic-dichroic compound can be aligned while in an activated state, with some embodiments.

Imbibing a photochromic-dichroic compound into a previously applied anisotropic material can involve, with some embodiments, applying a solution or mixture of the photochromic-dichroic compound in a carrier to the previously applied anisotropic material, and allowing the photochromic-dichroic compound to diffuse into the anisotropic material, for example with or without heating. The previously applied anisotropic material can, with some embodiments, be part of a phase-separated polymer coating, as describe above.

The photochromic-dichroic articles of the present invention can with some embodiments include a topcoat layer, that optionally includes an ultraviolet light absorber, and which resides over both of the fixed-polarized layer and the photochromic-dichroic layer. With reference to FIG. 6, topcoat layer 51 resides over photochromic-dichroic layer 30, and fixed-polarized layer 24 is interposed between first surface 15 of substrate 12 and photochromic-dichroic layer 30. With some further embodiments, the topcoat layer resides over the fixed-polarized layer, and the photochromic-dichroic layer is interposed between the first surface of the substrate and the fixed-polarized layer (not depicted in FIG. 6).

The topcoat layer can include a single layer or multiple layers at least one of which optionally includes an ultraviolet light absorber. The topcoat layer typically includes an organic matrix, such as a thermoplastic organic matrix and/or a crosslinked organic matrix. Additionally or alternatively to an organic matrix, the topcoat layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The topcoat layer can be formed by art-recognized methods including, but not limited to: lamination, such as of one or more plastic sheets or films; in-mold formation, such as in-mold coating; film casting; and coating methods. Typically, the topcoat layer is formed from a topcoat coating composition. The topcoat coating composition can be a curable topcoat coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The topcoat layer can have any suitable thickness. With some embodiments, the topcoat has a thickness of from 0.5 microns to 10 microns, such as from 1 to 8 microns, or from 2 to 5 microns, inclusive of the recited values.

With some embodiments, the topcoat layer includes an organic matrix formed from a radiation-cured acrylate-based composition, and correspondingly, the topcoat layer can be described as an acrylate-based topcoat layer.

The acrylate-based topcoat layer can be prepared using (meth)acrylate monomers and/or (meth)acrylic acid monomers. The (meth)acrylate monomers can include one, two, three, four, or five (meth)acrylate groups. Additional co-polymerizable monomers, such as epoxy monomers, e.g., monomers containing a epoxy (or oxirane) functionality, monomers containing both (meth)acrylate and epoxy functionalities, etc., can also be present in the formulation used to prepare the (meth)acrylate-based topcoat layer. The monomers used to prepare the (meth)acrylate-based topcoat layer include a plurality, e.g., a major amount, i.e., more than 50 weight percent, of (meth)acrylate monomers; hence the designation "(meth)acrylate-based topcoat layer." The formulations used to prepare the (meth)acrylate-based topcoat layer can also contain components having at least one isocyanate (—NCO) group, e.g., organic monoisocyanates, organic diisocyanates, and organic triisocyanates, whereby urethane linkages can be incorporated into the topcoat layer.

The (meth)acrylate-based topcoat layer typically possesses physical properties including, for example, transparency, adherence to the underlying second photochromic-dichroic layer, resistance to removal by aqueous alkali metal hydroxide, compatibility with an optional abrasion-resistant coating, such as a hardcoat layer, applied to its surface, and scratch resistance. With some embodiments, the (meth)acrylate-based topcoat layer has a hardness that is greater than that of the second photochromic-dichroic layer.

Radiation curing of (meth)acrylate-based polymeric systems can be achieved with, for example, electron beam curing (EB) and/or ultraviolet light (UV) radiation. Ultraviolet curing typically requires the presence of at least one photoinitiator, whereas curing by EB techniques does not require a photoinitiator. With the exception of the presence or absence of the photoinitiator, the (meth)acrylate-based formulations, which are cured by either UV or EB radiation technology, can otherwise be identical.

Radiation-curable (meth)acrylate-based polymeric systems are well known in the polymeric art, and any such system can be used to produce the (meth)acrylate-based topcoat layer of the photochromic-dichroic article of the present invention. In accordance with some embodiments, the (meth)acrylate-based topcoat layer is formed from a composition that includes a combination or miscible blend of one or more free-radical initiated (meth)acrylate monomers and/or (meth)acrylate oligomers, and one or more cationic initiated epoxy monomers. When this blend of monomers is cured, a (meth)acrylate-based topcoat layer, in the form of a polymerizate, is formed and includes an interpenetrating network of polymer components.

Examples of (meth)acrylate monomers that can be included in compositions from which the (meth)acrylate-based topcoat layer can be formed, include, but are not limited to, polyfunctional (meth)acrylates having, for example, 1, 2, 3, 4, or 5 (meth)acrylate groups, and monofunctional (meth)acrylates, e.g., a monomer containing a single (meth)acrylate group, hydroxy-substituted (meth)acrylates and alkoxysilyl alkylacrylates, such as trialkoxysilylpropylmethacrylate. Other reactive monomers/diluents, such as monomers containing an ethylenic functional group (other than the (meth)acrylate monomers) can also be present.

Compositions from which the (meth)acrylate-based topcoat layer can be formed, and methods of applying and curing such compositions, are disclosed at column 16, line 14 through column 25, line 3 of U.S. Pat. No. 7,452,611 B2, which disclosure is incorporated herein by reference.

Compositions from which the topcoat layer is formed can include one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

With some embodiments, the compositions from which the (meth)acrylate-based topcoat layer can be formed, can further include an adhesion promoter. The adhesion promoter can be selected from, for example, organo-silanes, such as aminoorganosilanes, organic titanate coupling agents, organic zirconate coupling agents, and combinations thereof. Examples of adhesion promoters, which can be included in the compositions from which the acrylate-based topcoat layer can be formed, include, but are not limited to, those disclosed at column 5, line 52 through column 8, line 19 of U.S. Pat. No. 7,410,691 B2, which disclosure is incorporated herein by reference.

The topcoat layer, with some embodiments, includes an ultraviolet light absorber. The ultraviolet light absorber can be selected from one or more art-recognized classes of ultraviolet light absorbers, including, but not limited to: hindered amines, which can include, for example, one or more 2,2,6,6-tetramethyl N-substituted piperidine groups; benzophenones; and/or benzotriazoles. The ultraviolet light absorber is typically present in at least an effective amount, such as from 0.1 to 10 percent by weight, or 0.2 to 5 percent by weight, or from 0.3 to 3 percent by weight, based on the total solids weight of the coating composition from which the topcoat layer is prepared.

The photochromic-dichroic articles of the present invention can, with some embodiments, include a hard coat layer that resides over the topcoat layer. With reference to FIG. 6, photochromic-dichroic article 3 includes a hard coat layer 54 that resides over topcoat layer 51. The hard coat layer can include a single layer or multiple layers.

The hard coat layer can be selected from abrasion-resistant coatings including organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the hard coat layer can include a first coating of a radiation-cured acrylate-based thin film and a second coating including an organo-silane. Non-limiting examples of commercial hard coating products include SIL-VUE® 124 and HI-GARD® coatings, available from SDC Coatings, Inc. and PPG Industries, Inc., respectively.

The hard coat layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat layer can be applied by art-recognized methods, such as spin coating.

Other coatings that can be used to form the hard coat layer, include, but are not limited to, polyfunctional acrylic hard coatings, melamine-based hard coatings, urethane-based hard coatings, alkyd-based coatings, silica sol-based hard coatings or other organic or inorganic/organic hybrid hard coatings.

The hard coat layer, with some embodiments, is selected from organo-silane type hard coatings. Organo-silane type hard coatings from which the hard coat layer of the photochromic-dichroic articles of the present invention can be selected include, but are not limited to, those disclosed at column 24, line 46 through column 28, line 11 of U.S. Pat. No. 7,465,414 B2, which disclosure is incorporated herein by reference.

With some embodiments, the photochromic-dichroic articles of the present invention include a primer layer. With some embodiments, the primer layer is interposed between the first surface of the substrate and the photochromic-dichroic layer. With some further embodiments, the primer layer is interposed between the first surface of the substrate and the fixed-polarized layer. For purposes of non-limiting illustration and with reference to FIG. 6, primer layer 48 is interposed between first surface 15 of substrate 12 and fixed-polarized layer 24, and more particularly, primer layer 48 abuts first surface 15 of substrate 12 and abuts fixed-polarized layer 24.

The primer layer can include a single layer or multiple layers that can be the same or different. The primer layer typically includes an organic matrix, such as a thermoplastic organic matrix and/or a crosslinked organic matrix. Additionally or alternatively to an organic matrix, the primer layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The primer layer can be formed by art-recognized methods including, but not limited to: lamination, such as of one or more plastic sheets or films; in-mold formation, such as in-mold coating; film casting; and coating methods. Typically, the primer layer is formed from a primer coating composition. The primer coating composition can be a curable primer coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The primer layer can have any suitable thickness. With some embodiments, the primer has a thickness of from 0.5 microns to 20 microns, such as from 1 to 10 microns, or from 2 to 8 microns, or from 3 to 5 microns, inclusive of the recited values.

With some embodiments, the primer layer includes an organic matrix that includes urethane linkages. In accordance with some embodiments, the primer layer containing urethane linkages is formed from a curable coating composition that includes: a (meth)acrylate copolymer having active hydrogen functionality selected from hydroxyl, thiol, primary amine, secondary amine, and combinations thereof; blocked isocyanate, such as diisocyanate and/or triisocyanate blocked with a suitable blocking or leaving group, such as, 3,5-dimethylpyrazole; and one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Additional polyols that can be used in the primer coating compositions from which the primer layer is prepared include, but are not limited to, art-recognized materials, such as described in U.S. Pat. No. 7,465,414 at column 15, line 22 through column 16, line 62, which disclosure is incorporated herein by reference. Isocyanates that can be used in the primer coating compositions from which the primer layer is prepared include, but are not limited to, art-recognized materials, such as described in U.S. Pat. No. 7,465,414 at column 16, line 63 through column 17, line 38, which disclosure is incorporated herein by reference. Catalysts that can be used in the primer coating compositions from which the primer layer is prepared include, but are not limited to, art-recognized materials, such as described in U.S. Pat. No. 7,465,414 at column 17, lines 39-62, which disclosure is incorporated herein by reference.

The primer layer can include one or more additives. Such additives can include, but are not limited to, ultraviolet light absorbers, stabilizers, such as hindered amine light stabilizers (HALS), antioxidants, e.g., polyphenolic antioxidants, asymmetric diaryloxalamide (oxanilide) compounds, singlet oxygen quenchers, e.g., a nickel ion complex with an organic ligand, and mixtures and/or combinations of such photochromic performance enhancing additive materials.

The primer layer can be applied over the substrate by art-recognized methods including, but not limited to, spray application, spin coating, doctor (or draw-down) blade application, and curtain application.

The primer layer can include at least partial hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

In addition or alternatively to coupling agents and/or hydrolysates of coupling agents, the primer layer can include other adhesion enhancing ingredients. For example, although not limiting herein, the primer layer can further include an adhesion-enhancing amount of an epoxy-containing material. Adhesion-enhancing amounts of an epoxy-containing materials when included in the primer layer, can improve the adhesion of a subsequently applied coating or layer. A class of an epoxy (or oxirane) functional adhesion promoters that can be included in compositions from which the primer layer is formed include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

The photochromic-dichroic articles of the present invention can include additional coatings or layers, such as antireflective coatings or layers. With some embodiments, an antireflective coating can be applied over the hard coat layer. Examples of antireflective coatings are described in U.S. Pat. No. 6,175,450 and International Patent Publication WO 00/33111, the disclosures of which are incorporated herein by reference.

Figure 2:
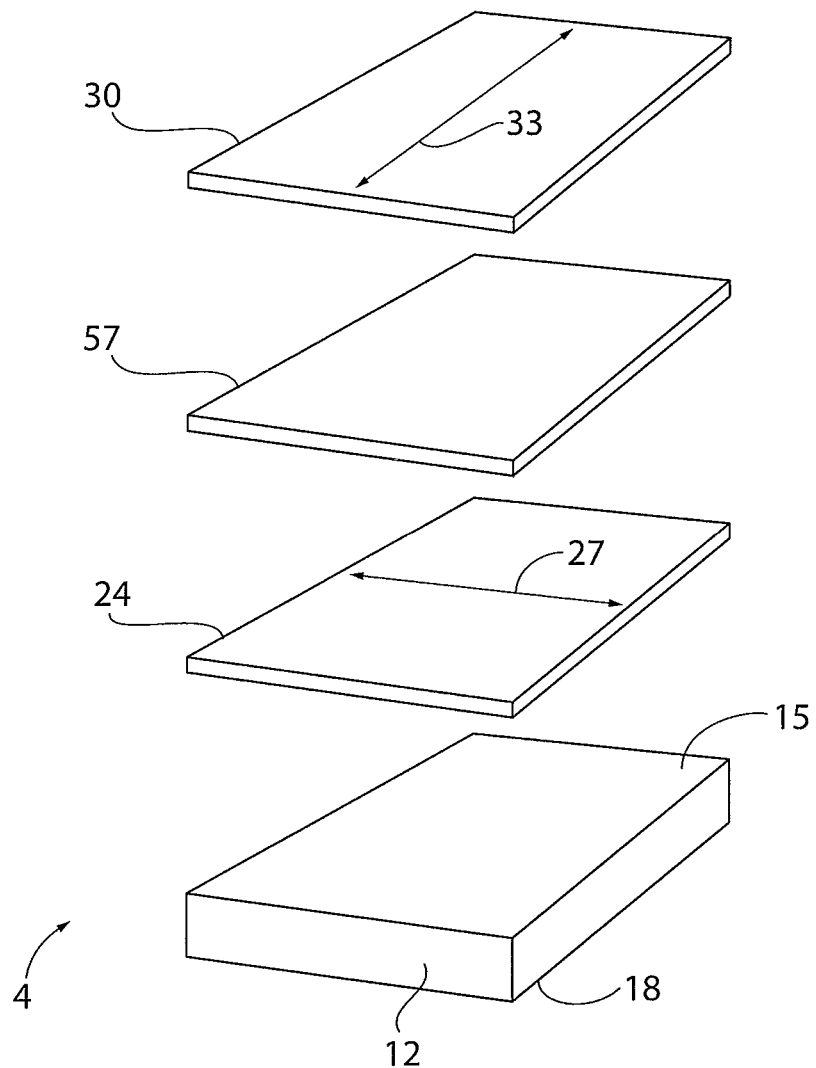
FIG. 2 is a representative exploded perspective view of a photochromic-dichroic article according to some embodiments of the present invention that includes a birefringent layer interposed between the separate fixed-polarized and photochromic-dichroic layers.

With some embodiments of the present invention, the photochromic-dichroic article further includes a birefringent layer that includes a polymer. The birefringent layer is interposed between the fixed-polarized layer and the photochromic-dichroic layer. With reference to FIG. 2, photochromic-dichroic article 4 includes a birefringent layer 57 that is interposed between fixed-polarized layer 24 and photochromic-dichroic layer 30. The birefringent layer can also be referred to herein as a compensation layer or a retardation layer. The birefringent layer can be composed of a single layer or multiple layers. When the birefringent layer is composed of multiple layers, each layer can be the same, or at least two layers of the multiple layers can be different. The birefringent layer can be formed from one or more polymeric sheets, one or more coating compositions, and combinations thereof.

With some embodiments, the birefringent layer is included for purposes of providing the photochromic-dichroic articles of the present invention with color enhancing properties and/or spectral filtering properties. In accordance with some embodiments, the properties of the birefringent layer, such as the degree of color enhancement, spectral filtering, circular polarization, and/or elliptical polarization provided thereby, can be selected by modifying one or more of the thickness, refractive index, and level of anisotropic order of the birefringent layer. The level of anisotropic order of the birefringent layer can, with some embodiments, be adjusted by unilateral stretching of the birefringent layer and/or anisotropically ordering one or more liquid crystal materials within the birefringent layer, in accordance with art-recognized methods.

In accordance with some embodiments of the present invention, the birefringent layer is operable to circularly polarize transmitted radiation or elliptically polarize transmitted radiation. As used herein, and with some embodiments, the term "transmitted radiation" with regard to the birefringent layer means the radiation that is transmitted through the birefringent layer. With some embodiments, the birefringent layer includes a quarter-wave plate or layer. In accordance with some further embodiments, the birefringent layer defines a quarter-wave plate.

The birefringent layer, with some embodiments, includes a first ordered region having a first general direction, and at least one second ordered region adjacent the first ordered region having a second general direction that is the same or different from the first general direction so as to form a desired pattern in the birefringent layer. Desired patterns include, but are not limited to, indicia, such as alpha-numerics, and designs.

Materials from which the birefringent layer can be prepared, with some embodiments, include birefringent materials that are known in the art. For example, a polymer film, a liquid crystal film, self-assembling materials, or a film in which a liquid crystal material is aligned can be used as or to form the birefringent layer. Examples of birefringent layers include, but are not limited to, those described in U.S. Pat. No. 6,864,932 at column 3, line 60 to column 4, line 64; U.S. Pat. No. 5,550,661 at column 4, line 30 to column 7, line 2; U.S. Pat. No. 5,948,487 at column 7, line 1 to column 10, line 10, the cited disclosures of which, in each case, is incorporated herein by reference.

With some embodiments, the birefringent layer includes a polymeric coating (or is formed from polymeric coating composition). With some further embodiments, the polymer coating (or polymer coating composition) can include self-assembling materials and/or film-forming materials.

Examples of commercially available birefringent films or sheets from which the birefringent layer can be formed include: film Model No. NRF-140, a positively birefringent, uniaxial film available from Nitto Corporation, Japan, or Nitto Denko America, Inc., New Brunswick, N.J.; and OPTI-GRAFIX circular polarizer films; available from GRAFIX Plastics, a division of GRAFIX, Inc., Cleveland, Ohio.

The birefringent layer includes one or more polymers. Examples of polymers that can be included in the birefringent layer, and/or from which the birefringent layer can be prepared, include, but are not limited to, polyacrylates, polymethacrylates, poly($C_1$-$C_{12}$) alkyl methacrylates, polyoxy(alkylene methacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, polyalpha methylstyrene), copoly(styrene-methylmethacrylate), copoly(styrene-acrylonitrile), polyvinylbutyral and polymers of members of the group consisting of polyol(allyl carbonate) monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers; and in particular self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof. With some embodiments, the birefringent layer is formed from one or more polymer sheets that each include one or more polymers, such as, but not limited to, those examples recited with regard to the polymer that can be included in the birefringent layer, and/or from which the birefringent layer can be prepared.

In accordance with some embodiments, the birefringent layer includes a polymeric sheet comprising, self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof.

The birefringent layer can, with some embodiments, be positioned in such a way that a slow axis direction (direction where a refractive index is largest in a plane) of the birefringent layer is oriented with respect to an alignment direction of the photochromic-dichroic layer so as to yield the desired resultant polarization, such as circular polarization or elliptical polarization. For example, a quarter-wave plate, with some embodiments, would be oriented at an angle of 45°+/−5° or 45°+/−3° with respect to an alignment direction of the photochromic-dichroic compound of the photochromic-dichroic layer.

In accordance with some embodiments of the photochromic-dichroic articles of the present invention, the substrate includes has a first polarization axis, and can be referred to herein as a linearly polarizing substrate. A photochromic-dichroic layer that includes a photochromic-dichroic compound and has a second polarization axis, as described previously herein, is positioned over the substrate. The first polarization axis of the substrate and the second polarization axis of the photochromic-dichroic layer are oriented relative to each other at an angle of greater than 0° and less than or equal to 90°. With some embodiments, the linearly polarizing substrate optionally includes a fixed-colorant.

Figure 3:
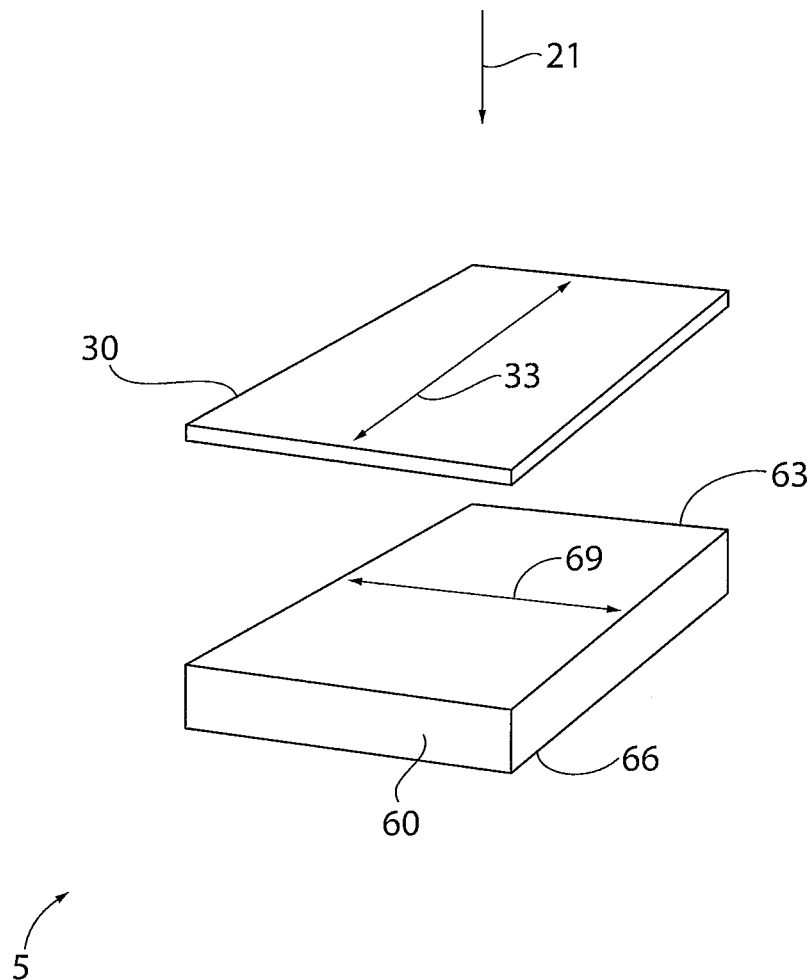
FIG. 3 is a representative exploded perspective view of a photochromic-dichroic article according to some embodiments of the present invention that includes a substrate that is linearly polarizing and a photochromic-dichroic layer thereover.

For purposes of non-limiting illustration and with reference to FIG. 3, photochromic-dichroic article 3 includes a substrate 60 having a first surface 63 and a second surface 66. First surface 66 of substrate 60, with some embodiments, faces incident actinic radiation depicted by arrow 21. Substrate 66 also has a first polarization axis represented by double-headed arrow 69. Photochromic-dichroic article 5 further includes a photochromic-dichroic layer 30 that is positioned over first surface 63 of substrate 60, and which includes a photochromic-dichroic compound that is laterally aligned within the layer, and which defines a second polarization axis represented by double headed arrow 33. The photochromic-dichroic layer and photochromic-dichroic compound thereof are each as described previously herein.

The optional fixed-colorant of the linearly polarizing substrate, such as substrate 60, is, with some embodiments, as described previously herein with regard to the fixed-polarized layer, such as fixed-polarized layer 24. The linearly polarizing substrate, such as substrate 60, can, with some embodiments, be selected from those classes and examples of substrates, and can include one or more optional additives, as described previously herein, for example with regard to substrate 12. The linear polarizing properties of the linearly polarizing substrate can be obtained in accordance with art-recognized methods, including but not limited to those methods and procedures as described previously herein with regard to the fixed-polarized layer, such as fixed-polarized layer 24. The linearly polarizing substrate can include one or more additives as described previously herein with regard to the fixed-polarized layer, such as, but not limited to, dichroic compounds, dichroic-fixed-colorants, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

The first polarization axis of the linearly polarizing substrate and the second polarization axis of the photochromic-dichroic layer are oriented relative to each other at an angle of greater than 0° and less than or equal to 90°, such as from 0.1° to 90°, or from 1° to 90°, or from 10° to 90°, or from 25° to 90°, or from 45° to 90°, or from 60° to 90°, inclusive of the recited values. With some embodiments, when the first polarization axis of the linearly polarizing substrate and second polarization axis of the photochromic-dichroic layer are oriented relative to each other at an angle of 90°, the photochromic-dichroic articles of the present invention have a minimum level of transmittance of incident actinic radiation, provided the photochromic-dichroic compound undergoes both photochromic activation (e.g., being converted to a colored state) and dichroic activation when exposed to incident actinic radiation, such as when exposed to direct sunlight. For purposes of illustration, and with non-limiting reference to FIG. 3, first polarization axis 69 of linearly polarizing substrate 60 and second polarizing axis 33 of photochromic-dichroic layer 30 are oriented relative to each other at an angle of substantially 90°.

In accordance with some embodiments, the photochromic-dichroic articles of the present invention further include a birefringent layer that includes a polymer, in which the birefringent layer is interposed between the substrate (such as the linearly polarizing substrate) and the photochromic-dichroic layer. For purposes of illustration and with non-limiting reference to FIG. 4, photochromic-dichroic article 6 includes a birefringent layer 72 interposed between substrate 60 (which can be referred to herein as a linearly polarizing substrate) and photochromic-dichroic layer 30. With some embodiments, the birefringent layer, such as birefringent layer 72, is as described previously herein, such as with regard to birefringent layer 57.

Figure 4:
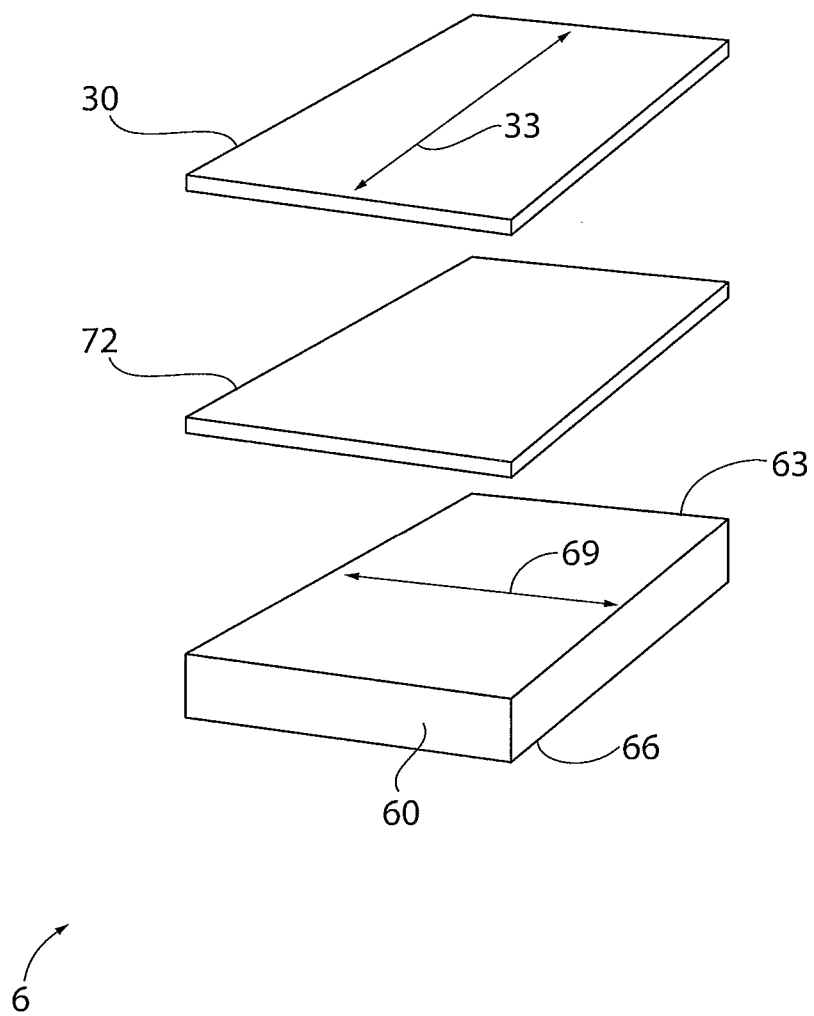
FIG. 4 is a representative exploded perspective view of a photochromic-dichroic article according to some embodiments of the present invention that includes a birefringent layer interposed between a linearly polarizing substrate and a photochromic-dichroic layer.

The photochromic-dichroic articles of the present invention that include a linearly polarizing substrate, such as substrate 60, can include one or more additional layers as described previously herein, such as alignment, primer, topcoat, hard coat, and/or antireflective layers (not shown in FIGS. 3 and 4).

In accordance with further embodiments, the photochromic-dichroic articles of the present invention can be selected from ophthalmic articles or elements, display articles or elements, windows, mirrors, packaging material such as shrink-wrap, and active and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, protective lenses, and visors, such as protective visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With some embodiments, the photochromic-dichroic article can be a security element. Examples of security elements include, but are not limited to, security marks and authentication marks that are connected to at least a portion of a substrate, such as: access cards and passes, e.g., tickets, badges, identification or membership cards, debit cards, etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security elements according to the aforementioned embodiments can further include one or more other coatings or films or sheets to form a multi-layer reflective security element with viewing angle dependent characteristics, such as described in U.S. Pat. No. 6,641,874.

The present invention is more particularly described in the following examples, which are intended to be illustrative only, since numerous modifications and variations therein will be apparent to those skilled in the art. Unless otherwise specified, all parts and all percentages are by weight.

EXAMPLES

Preparation of Coating #1 is described in Parts 1A & 1B and Coating #2 in Part 2. The cleaning procedure for the substrate is described in Part 3 and the coating procedures for the photoalignment layers as well as Coatings #1 and #2 are described in Parts 4A to 4D. The preparation of the Transitional coating solution (Topcoat) and the coating application procedure are described in Part 5. The preparation of the Protective coating (Hard Coat) and the coating application procedure are described in Part 6. Photochromic-Dichroic performance testing is described in Part 7. Results for Examples 1, 1A & 1B to 3, 3A & 3B and Comparative Example 1, 1A and 1B are included in Table 1.

Part 1A: Preparation of Solutions of Anisotropic Materials

To a suitable flask containing a mixture of anisole (3.990 g) and BYK®-322 additive (0.004 g) reported to be an aralkyl modified poly-methyl-alkyl-siloxane available from BYK Chemie, USA, was added liquid crystal monomers RM-257 (3.000 g), reported to have the molecular formula of $C_{33}H_{32}O_{10}$, and RM-105 (3.000 g), reported to have the molecular formula of $C_{23}H_{26}O_6$, both are available from EMD Chemicals, Inc., 4-methoxyphenol (0.006 g), and IRGACURE® 819 (0.090 g), a photoinitator available from Ciba-Geigy Corporation). The resulting mixture was stirred for 2 hours at 60° C. until the solids were dissolved as determined by visual observation and cooled to about 26° C.

Part 1B: Preparation of Coating #1 of Anisotropic Materials and Dichroic Materials:

The following three dichroic dyes, which are available from Mitsubishi Chemical, were used to prepare a fixed-tint grey liquid crystal monomer solution (LCMS). The Gray-LCMS was prepared by adding the following weight percent, based on monomer solids, of 19.0% FT-38, 11.0% FT-49, and 70% FT-104 to the monomer solution prepared in Part 1A. The solution was heated to 90° C. for 60 minutes and then cooled to about 26° C.

Part 2: Preparation of Coating #2 of Anisotropic Materials and Photochromic-Dichroic Materials To a suitable flask containing a mixture of anisole (3.990 g) and BYK®-322 additive 0.004 g, was added RM-257 (1.500 g), RM-105 (1.500 g), RM-82 (1.500 g), reported as having the molecular formula of $C_{39}H_{44}O_{10}$, LCM-1 (1.500 g) described below, Grey photochromic-dichroic dye combination (0.720 grams of the following weight percent mixture of dyes: 20% Photochromic-Dichroic #1, an indenonaphthopyran that demonstrates a yellowish brown activated color; 15% Photochromic-Dichroic #2, an indenonaphthopyran that demonstrates a greenish blue activated color; and 65% Photochromic-Dichroic #3, an indenonaphthopyran that demonstrates a cyan activated color; that was heated to 80° C. for 60 minutes and then cooled to about 26° C.), 4-methoxyphenol (0.006 g), and IRGACURE® 819 (0.090 g). The resulting mixture was stirred for 2 hours at 60° C. and cooled to about 26° C.

LCM-1 is 1-(6-(6-(6-(6-(6-(6-(6-(6-(6-(8-(4-(4-(4-(8-acryloyloxyhexyl)oxy)benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol which was prepared according to the procedures described in Example 17 of U.S. Patent Publication 2009/0323011, which liquid crystal monomer disclosure is incorporated herein by reference.

Part 3: Substrate Cleaning

Square substrates measuring 5.08 cm by 5.08 cm by 0.318 cm (2 inches (in.) by 2 in. by 0.125 in.) prepared from CR-39® monomer were obtained from Homalite, Inc. Each substrate was cleaned by wiping with a tissue soaked with acetone, dried with a stream of air and corona treated by passing on a conveyor belt in Tantec EST Systems Serial No. 020270 Power Generator HV 2000 series corona treatment equipment with a high voltage transformer. The substrates were exposed to corona generated by 53.99 KV, 500 Watts while traveling on a conveyor at a belt speed 3 ft/min.

Part 4A: Coating Procedure for the First Photoalignment Layer

The photoalignment material, Staralign™ 2200 CP2, from Vantico, Inc., was applied to the test substrates by spin-coating on a portion of the surface of the test substrate by dispensing approximately 1.0 mL of the solution and spinning the substrates at 800 revolutions per minute (rpm) for 3 seconds, followed by 1,000 rpm for 7 seconds, followed by 2500 rpm for 4 seconds. A spin processor from Laurell Technologies Corp. (WS-400B-6NPP/LITE) was used for spin coating. Afterwards, the coated substrates were placed in an oven maintained at 120° C. for 30 minutes. The coated substrates were cooled to about 26° C.

The dried photoalignment layer on each of the substrates was at least partially ordered by exposure to linearly polarized ultraviolet radiation using a DYMAX® UVC-6 UV/conveyor system by DYMAX Corp. having a 400 Watt power supply. The light source was oriented such that the radiation was linearly polarized in a plane perpendicular to the surface of the substrate. The amount of ultraviolet radiation that each photoalignment layer was exposed to was measured using a UV Power Puck™ High energy radiometer from EIT Inc (Serial No. 2066) and was as follows: UVA 0.126 W/cm$^2$ and 5.962 J/cm$^2$; UVB 0.017 W/cm$^2$ and 0.078 J/cm$^2$; UVC 0 W/cm$^2$ and 0 J/cm$^2$; and UVV 0.046 W/cm$^2$ and 2.150 J/cm$^2$. After ordering at least a portion of the photo-orientable polymer network, the substrates were cooled to about 26° C. and kept covered.

Part 4B: Coating Procedure for Coating #1

Coating #1 (approximately 2.0 mL) was applied to each substrate by spin coating at a rate of 2000 revolutions per minute (rpm) for 10 seconds onto the at least partially ordered photoalignment materials. Each coated substrate was placed in an oven at 60° C. for 30 minutes. Afterwards, the substrates were cured under two ultraviolet lamps in the UV Curing Oven Machine designed and built by Belcan Engineering in a nitrogen atmosphere while running on a conveyor belt at 2 ft/min speed at peak intensity of 0.445 Watts/cm$^2$ of UVA and 0.179 Watts/cm$^2$ of UVV and UV dosage of 2.753 Joules/cm$^2$ of UVA and 1.191 Joules/cm$^2$ of UW. Each of the cured layers was exposed to corona generated by 53.00 KV, 500 Watts while traveling on a conveyor at a belt speed 3 ft/min.

Part 4C: Coating Procedure for Second Photoalignment Layer

A second application of photoalignment material was applied following the procedure of Part 4A. The second photoalignment layer was dried and at least partially ordered at a 0°, 30°, 60° or 90° orientation to the first alignment layer by rotating the substrate to the appropriate angle and exposing it to linearly polarized ultraviolet radiation as described in Part 4A.

Part 4D: Coating Procedure for Coating #2

Coating #2 (approximately 2.0 mL) was applied onto the at least partially ordered photoalignment layer prepared in Part 4C by spin coating at a rate 800 revolutions per minute (rpm) for 3 seconds, followed by 1,000 rpm for 7 seconds, followed by 2500 rpm for 4 seconds. Each coated substrate was placed in an oven at 60° C. for 30 minutes. Afterwards the substrates were cured under two ultraviolet lamps in the UV Curing Oven Machine designed and built by Belcan Engineering in nitrogen atmosphere as described in Part 4B. The cured layer were exposed to corona generated by 53.00 KV, 500 Watts while traveling on a conveyor at a belt speed 3 ft/min, if a subsequent coating layer was to be applied. Otherwise, the samples were post-baked for 3 hrs at 105° C. The substrates having Coating #2 at 30° orientation to Coating 1 were Example 1; Coating #2 at 60° orientation to Coating #1 were Example 2; Coating #2 at 90° orientation to Coating #1 were Example 3; Coating #2 at 0° orientation to Coating 1 were Comparative Example (CE) 1.

Part 5: Coating Procedure for Transitional Coating (TC)

The Transitional coating solution was prepared as follows: In a 50 mL amber glass bottle equipped with a magnetic stir-bar following materials were added:

Hydroxy methacrylate (1.242 g) from Sigma-Aldrich;
Neopentyl glycol diacrylate (13.7175 g) SR247 from Sartomer;
Trimethylolpropane trimethacrylate (2.5825 g) SR350 from Sartomer;
DESMODUR® PL 340 (5.02 g) from Bayer Material Science;
IRGACURE®-819 (0.0628 g) from Ciba Speciality Chemicals;
DAROCUR® TPO (0.0628 g; from Ciba Speciality Chemicals,
Polybutyl acrylate (0.125 g),
3-Aminopropylpropyltrimethoxysilane (1.4570 g) A-1100 from Momentive Performance Materials;
200 proof absolute anhydrous Ethanol (1.4570 g) from Pharmaco-Aaper; and stirred at room temperature for 2 hours.

The Transitional coating (approximately 4.0 mL) was spin coated at a rate of 1,400 revolutions per minute (rpm) for 7 seconds onto the cured coated substrates. Afterwards the substrates were cured under two ultraviolet lamps in the UV Curing Oven Machine designed and built by Belcan Engineering in nitrogen atmosphere while running on a conveyor belt at 6 ft/min speed at peak intensity of 1.887 Watts/cm$^2$ of UVA and 0.694 Watts/cm$^2$ of UVV and UV dosage of 4.699 Joules/cm$^2$ of UVA and 1.787 Joules/cm$^2$ of UVV. The cured transitional layers were exposed to corona generated by 53.00 KV, 500 Watts while traveling on a conveyor at a belt speed 3 ft/min.

Part 6: Coating Procedure for the Protective Coating (PC)

The Protective coating was prepared as follows: Charge 1 was added to a clean dry beaker and placed in an ice bath at 5° C. with stirring. Charge 2 was added and an exotherm raised the temperature of the reaction mixture to 50° C. The temperature of the resulting reaction mixture was cooled to 20-25° C. and Charge 3 was added with stirring. Charge 4 was added to adjust the pH from about 3 to about 5.5. Charge 5 was added and the solution was mixed for half an hour. The resulting solution was filtered through a nominal 0.45 micron capsule filter and stored at 4° C. until use.

| Charge 1 | |
| --- | --- |
| Glycidoxypropyltrimethoxysilane | 32.4 grams |
| Methyltrimethoxysilane | 345.5 grams |
| Charge 2 | |
| Solution of deionized water (DI) with nitric acid (nitric acid 1 g/7000 g) | 292 grams |
| Charge 3 | |
| DOWANOL ® PM solvent | 228 grams |
| Charge 4 | |
| TMAOH (25% tetramethylamonium hydroxide in methanol) | 0.45 grams |
| Charge 5 | |
| BYK ®-306 surfactant | 2.0 grams |

The resulting Protective coating solution (approximately 4.0 mL) was spin coated at a rate of 2,000 revolutions per minute (rpm) for 10 seconds onto the cured transitional layer coated substrates. Post curing of the coated substrates was completed at 105° C. for 3 hours.

Part 7: Photochromic-Dichroic Performance Testing

Each of the coated substrates prepared above were tested in duplicate for photochromic response on the Bench for Measuring Photochromics ("BMP") optical bench made by Essilor, Ltd. France. The optical bench was maintained at a constant temperature of 73.4° F. (23° C.) during testing.

Prior to testing on the optical bench, each of the coated substrates were exposed to 365-nanometer ultraviolet light for about 10 minutes at a distance of about 14 centimeters to activate the photochromic-dichroic materials. The UVA (315 to 380 nm) irradiance at the substrate was measured with a LICOR® Model Li-1800 spectroradiometer and found to be 22.2 watts per square meter. The substrate was then placed under a 500 watt, high intensity halogen lamp for about 10 minutes at a distance of about 36 centimeters to bleach (inactivate) the photochromic-dichroic materials. The illuminance at the substrate was measured with the LICOR® spectroradiometer and found to be 21.4 Klux. The substrates were then kept in a dark environment at room temperature (from 70 to 75° F., or 21 to 24° C.) for at least 1 hour prior to testing on an optical bench. Prior to optical bench measurement, the substrates were measured for ultraviolet absorbance at 390 nanometers.

The BMP optical bench was fitted with two 150-watt ORIEL® Model #66057 Xenon arc lamps at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch 50% polka dot beam splitter, at 45° to each lamp is used to mix the two beams. The combination of neutral density filters and voltage control of the Xenon arc lamp were used to adjust the intensity of the irradiance. Proprietary software was used on the BMP to control timing, irradiance, air cell and sample temperature, shuttering, filter selection and response measurement. A ZEISS® spectrophotometer, Model MCS 501, with fiber optic cables for light delivery through the substrate was used for response and color measurement. Photopic response measurements, as well as the response at four select wavelengths, were collected on each substrate.

The power output of the optical bench, i.e., the dosage of light that the substrate was exposed to, was adjusted to 6.7 Watts per square meter ($W/m^2$) UVA, integrated from 315-380 nm and 50 Klux illuminance, integrated from 380-780 nm. Measurement of the power output was made using the optometer and software contained within the BMP.

Response measurements, in terms of a change in optical density (DOD) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: $\Delta OD = \log(10)(\% Tb/\% Ta)$, where % Tb is the percent transmittance in the bleached state, % Ta is the percent transmittance in the activated state. Optical density measurements were based on photopic optical density.

The results of this testing are presented below in Table 1, wherein the DOD at saturation is after 15 minutes of activation and the Fade Half Life ("T ½") value is the time interval in seconds for the $\Delta OD$ of the activated form of the photochromic-dichroic material in the coating to reach one half the fifteen-minute $\Delta OD$ at 73.4° F. (23° C.), after removal of the activating light source. Results reported are an arithmetic average of duplicate test substrates for each Example and Comparative Example.

In Table 1, Example 1 has Coating #2 at a 30° orientation to Coating #1; Example 1A has a Transitional Coating (TC) applied to Example 1; and Example 1B has a Protective Coating (PC) applied to Example 1A; Example 2 has Coating #2 at a 60° orientation to Coating #1; Example 2A has a TC applied to Example 2; and Example 2B has a PC applied to Example 2A; Example 3 has Coating #2 at a 90° orientation to Coating #1; Example 3A has a TC applied to Example 3; and Example 3B has a PC applied to Example 3A; Comparative Example (CE) 1 has Coating #2 at a 0° orientation to Coating #1; CE 1A has a TC applied to CE 1; and CE 1B has a PC applied to CE 1A.

TABLE 1

Performance of Photochromic-Dichroic Examples and Comparative Example

| Example # | % Ta | ΔOD at saturation | T½ secs. |
| --- | --- | --- | --- |
| 1 | 5.2 | 0.57 | 148 |
| 1A | 5.9 | 0.51 | 178 |
| 1B | 6.1 | 0.49 | 174 |
| 2 | 8.4 | 0.36 | 122 |
| 2A | 9.0 | 0.34 | 145 |
| 2B | 9.2 | 0.33 | 142 |
| 3 | 3.6 | 0.70 | 142 |
| 3A | 4.3 | 0.63 | 175 |
| 3B | 4.5 | 0.61 | 171 |
| CE-1 | 9.6 | 0.33 | 109 |
| CE-1A | 10.2 | 0.31 | 134 |
| CE-1B | 10.4 | 0.30 | 132 |

The present invention has been described with reference to specific details of particular embodiments thereof. It is not intended that such details be regarded as limitations upon the scope of the invention except insofar as and to the extent that they are included in the accompanying claims.

We claim:
1. A photochromic-dichroic article comprising:
   (a) a substrate having a first surface and a second surface;
   (b) a fixed-polarized layer positioned over said first surface of said substrate, said fixed-polarized layer having a first polarization axis; and
   (c) a photochromic-dichroic layer positioned over said first surface of said substrate, said photochromic-dichroic layer comprising a photochromic-dichroic compound, said photochromic-dichroic compound being laterally aligned within said photochromic-dichroic layer and defining a second polarization axis of said photochromic-dichroic layer;
   wherein said first polarization axis and said second polarization axis are oriented relative to each other at an angle of greater than 0° and less than or equal to 90°,
   wherein said fixed-polarized layer is interposed between said first surface of said substrate and said photochromic-dichroic layer.

2. The photochromic-dichroic article of claim 1, wherein said fixed-polarized layer comprises a polymer, said polymer being laterally aligned along a first lateral direction within said fixed-polarized layer and defining said first polarization axis of said fixed-polarized layer.

3. The photochromic-dichroic article of claim 1, wherein said fixed-polarized layer further comprises a fixed colorant.

4. The photochromic-dichroic article of claim 3, wherein said fixed colorant, of said fixed-polarized layer, comprises a fixed dye selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures thereof.

5. The photochromic-dichroic article of claim 1, wherein said photochromic-dichroic layer further comprises an anisotropic material.

6. The photochromic-dichroic article of claim 5, wherein said anisotropic material of said photochromic-dichroic layer comprises a liquid crystal material.

7. The photochromic-dichroic article of claim 1, wherein said photochromic-dichroic layer is defined by a polymeric sheet, said polymeric sheet comprising said photochromic-dichroic compound, said polymeric sheet being laterally aligned along a second lateral direction, and said photochromic-dichroic compound being substantially laterally aligned along said second lateral direction.

8. The photochromic-dichroic article of claim 1, wherein said photochromic-dichroic layer further comprises a phase-separated polymer comprising,
   a matrix phase that is at least partially ordered, and
   a guest phase that is at least partially ordered,
   wherein said guest phase comprises said photochromic-dichroic compound, and said photochromic-dichroic compound is at least partially aligned with at least a portion of said guest phase of said photochromic-dichroic layer.

9. The photochromic-dichroic article of claim 1, wherein said photochromic-dichroic layer further comprises an interpenetrating polymer network comprising,
   an anisotropic material that is at least partially ordered, and
   a polymeric material,
   wherein said anisotropic material of said photochromic-dichroic layer comprises said photochromic-dichroic compound, and said photochromic-dichroic compound is at least partially aligned with at least a portion of said anisotropic material of said photochromic-dichroic layer.

10. The photochromic-dichroic article of claim 1, wherein said photochromic-dichroic layer further comprises at least one additive selected from dyes, alignment promoters, horizontal alignment agents, kinetic enhancing additives, photoinitiators, thermal initiators, polymerization inhibitors, solvents, light stabilizers, heat stabilizers, mold release agents, rheology control agents, leveling agents, free radical scavengers, and adhesion promoters.

11. The photochromic-dichroic article of claim 1, wherein said photochromic-dichroic layer further comprises at least one dichroic material chosen from azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthraquinone and (poly)anthraquinones, anthrapyrimidinones, iodine and iodides.

12. The photochromic-dichroic article of claim 1, wherein said photochromic-dichroic compound comprises at least one photochromic moiety, and each photochromic moiety is independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

13. The photochromic-dichroic article of claim 1 further comprising an alignment layer interposed between said first surface of said substrate and said photochromic-dichroic layer, wherein said alignment layer and said photochromic-dichroic layer at least partially abut each other.

14. The photochromic-dichroic article of claim 1 further comprising a topcoat layer comprising an ultraviolet light absorber, wherein said topcoat layer resides over both of said fixed-polarized layer and said photochromic-dichroic layer.

15. The photochromic-dichroic article of claim 14 further comprising a hard coat layer, wherein said hard coat layer resides over said topcoat layer.

16. The photochromic-dichroic article of claim 1 further comprising a birefringent layer comprising a polymer, said birefringent layer being interposed between said fixed-polarized layer and said photochromic-dichroic layer.

17. The photochromic-dichroic article of claim 16, wherein said birefringent layer is operable to circularly polarize transmitted radiation or elliptically polarize transmitted radiation.

18. The photochromic-dichroic article of claim 16, wherein said birefringent layer comprises a first ordered region having a first general direction, and at least one second ordered region adjacent the first ordered region having a second general direction that is the same or different from the first general direction so as to form a desired pattern in said birefringent layer.

19. The photochromic-dichroic article of claim 16, wherein said birefringent layer comprises a polymeric coating comprising self-assembling materials or film-forming materials.

20. The photochromic-dichroic article of claim 16, wherein said birefringent layer comprises a polymeric sheet comprising, self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof.

21. The photochromic-dichroic article of claim 16, wherein the birefringent layer defines a quarter-wave plate.

22. The photochromic-dichroic article of claim 1, wherein said photochromic-dichroic article is selected from ophthalmic articles, display articles, windows, mirrors, and active liquid crystal cell articles, and passive liquid crystal cell articles.

23. The photochromic-dichroic article of claim 22, wherein said photochromic-dichroic article is selected from ophthalmic articles, the ophthalmic articles being selected from corrective lenses, non-corrective lenses, contact lenses, intra-ocular lenses, magnifying lenses, protective lenses, and visors.

24. The photochromic-dichroic article of claim 22, wherein said photochromic-dichroic article is selected from display articles, the display articles being selected from screens, monitors, and security elements.

25. The photochromic-dichroic article of claim 1, wherein the substrate is selected from untinted substrates, tinted substrates, photochromic substrates, and tinted-photochromic substrates.

26. A photochromic-dichroic article comprising:
(a) a substrate having a first surface and a second surface, and said substrate having a first polarization axis;
(b) a photochromic-dichroic layer positioned over said first surface of said substrate, said photochromic-dichroic layer comprising a photochromic-dichroic compound, said photochromic-dichroic compound being laterally aligned within said photochromic-dichroic layer and defining a second polarization axis of said photochromic-dichroic layer; and
(c) a birefringent layer comprising a polymer, said birefringent layer being interposed between said substrate and said photochromic-dichroic layer,
wherein said first polarization axis and said second polarization axis are oriented relative to each other at an angle of greater than 0° and less than or equal to 90°.

27. The photochromic-dichroic article of claim 26, wherein said substrate further comprises a fixed-colorant.

28. The photochromic-dichroic article of claim 27, wherein said fixed-colorant comprises a fixed dye selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures thereof.

29. A photochromic-dichroic article comprising:
(a) a substrate having a first surface and a second surface;
(b) a fixed-polarized layer positioned over said first surface of said substrate, said fixed-polarized layer having a first polarization axis, and said fixed-polarized layer further comprising a fixed colorant; and
(c) a photochromic-dichroic layer positioned over said first surface of said substrate, said photochromic-dichroic layer comprising a photochromic-dichroic compound, said photochromic-dichroic compound being laterally aligned within said photochromic-dichroic layer and defining a second polarization axis of said photochromic-dichroic layer,
wherein said first polarization axis and said second polarization axis are oriented relative to each other at an angle of greater than 0° and less than or equal to 90°.

* * * * *